(12) United States Patent
Bangalore Srinivas et al.

(10) Patent No.: US 11,260,539 B2
(45) Date of Patent: Mar. 1, 2022

(54) GRIPPER APPARATUS FOR MULTI OBJECT GRASPING AND STACKING

(71) Applicant: Tata Consultancy Services Limited, Mumbai (IN)

(72) Inventors: Venkatesh Prasad Bangalore Srinivas, Bangalore (IN); Pradeep Prabhakar Kamble, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 50 days.

(21) Appl. No.: 17/029,745

(22) Filed: Sep. 23, 2020

(65) Prior Publication Data
US 2021/0370524 A1    Dec. 2, 2021

(30) Foreign Application Priority Data

May 26, 2020  (IN) .............................. 202021022080

(51) Int. Cl.
*B25J 15/00* (2006.01)
*B65G 57/03* (2006.01)

(52) U.S. Cl.
CPC .......... *B25J 15/0038* (2013.01); *B65G 57/03* (2013.01)

(58) Field of Classification Search
CPC .............................. B25J 15/0038; B65G 57/03
USPC ........................................................ 414/815
See application file for complete search history.

(56) References Cited

U.S. PATENT DOCUMENTS

| | | | | |
|---|---|---|---|---|
| 4,592,692 A | * | 6/1986 | Suizu ..................... | B65G 61/00 294/107 |
| 6,763,926 B2 | | 7/2004 | Miglioranza | |
| 7,887,108 B1 | * | 2/2011 | Cawley ................ | B25J 15/0266 294/2 |
| 10,040,203 B2 | * | 8/2018 | Ochiishi .............. | B25J 15/0253 |
| 2002/0182039 A1 | | 12/2002 | Ostwald | |

FOREIGN PATENT DOCUMENTS

| | | |
|---|---|---|
| CN | 203854003 U | 10/2014 |
| CN | 105184019 A | 12/2015 |
| DE | 60313526 T2 | 1/2008 |
| EP | 0001686 B1 | 4/1981 |
| EP | 3423208 A1 | 12/2019 |

* cited by examiner

*Primary Examiner* — Saul Rodriguez
*Assistant Examiner* — Brendan P Tighe
(74) *Attorney, Agent, or Firm* — Finnegan, Henderson, Farabow, Garrett & Dunner LLP

(57) ABSTRACT

Object manipulation space optimization is a challenging task and used in applications such as heat treatment operation and transport packaging. Traditionally manual intervention is involved to grasp and place the objects for ensuring multi object stacking with zero gap between adjacent objects. This leads to higher cost infrastructure and low productivity. Further, conventional gripper devices fail to optimize object manipulation space and are unable to handle objects of different cross sections with larger lengths. The present disclosure provides a gripper apparatus addressing a single gripper design comprising an adaptor holding unit with a provision for different modular object holding units which are varied in accordance with size, shape and length of the object to be grasped and placed by the gripper apparatus. The modular object holding unit comprises a plurality of fingers which are actuated for grasping and stacking one or more objects such that object manipulation space is optimized.

13 Claims, 25 Drawing Sheets

GRIPPER APPARATUS FOR MULTI OBJECT GRASPING AND STACKING

CROSS-REFERENCE TO RELATED APPLICATIONS AND PRIORITY

The present application claims priority from Indian provisional patent application no. 202021022080, filed on May 26, 2020.

TECHNICAL FIELD

The disclosure herein generally relates to a gripper apparatus, and, more particularly, to gripper apparatus for multi object grasping and stacking.

BACKGROUND

Object manipulation and space optimization for handling complex objects in industries and warehouses (e.g., pick up and placement of objects in a pattern to make a stack of objects) is a challenging task because of the unstructured environment. The unstructured environment can have items/objects with different form factors, weight, shape, length and size. Pattern-based object stacking is utilized for heat treatment operations and/or transport packaging. Stacking though complex task is necessary since it is not viable to handle objects individually. Handling of the items/objects individually may introduce deformations in shape of the items/objects during heat treatment. In case of transport packaging, the objects/items may be damaged when individually transported instead of a stack. Additionally, it is not economically viable to handle individual object/item since space occupancy in a heat treatment chamber is usually more for individual objects rather than a stack. Thus, stacking and automation, though complex, are important part of industries. Further, even packaging can be different for a different item/object which makes the object manipulation a very challenging task to automate. In such scenario traditionally manual intervention (e.g. human being) is involved to pick up and place the objects/items for ensuring pattern-based object stacking. This leads to higher cost infrastructure and low productivity. Few conventional grippers are utilized for object manipulation. However, conventional grippers and approaches for object manipulation fail in space optimization during placement of the objects.

SUMMARY

Embodiments of the present disclosure present technological improvements as solutions to one or more of the above-mentioned technical problems recognized by the inventors in conventional systems. For example, in one aspect, there is provided a gripper apparatus for multi object grasping and stacking, the gripper apparatus comprises: an adaptor holding unit comprising a top mounting plate and a bottom mounting plate, wherein the adaptor holding unit comprises: a lead screw housing comprising a top end and a bottom end, wherein the top end of the lead screw housing is coupled to a bottom surface of the bottom mounting plate of the adaptor holding unit via a coupling mechanism, wherein the lead screw housing comprises: a plurality of slots, wherein each of the plurality of slots is equiangularly positioned from one another; a plurality of pair flanges, wherein each flange from the plurality of pair flanges comprises a corresponding hole; and a plurality of tapered slots, wherein each of the plurality of tapered slots is positioned at at least one corresponding slot from the plurality of slots, wherein each of the plurality of tapered slots is positioned in an inner area of the bottom surface of the lead screw housing and is protruding towards substantially center area of each corresponding pair of flanges; a plurality of threaded nut segments, wherein each of the plurality of threaded nut segments is adapted to slide in a corresponding slot of the plurality of slots, each of the plurality of threaded nut segments comprises a first end and a second end, wherein each of the first end and the second end comprises a hole; a plurality of jaws, each of the plurality of jaws comprises a first jaw sleeve and a second jaw sleeve that are positioned at a location from a first end and a second end of each of the plurality of jaws, wherein each of the first jaw sleeve and the second jaw sleeve comprises a first end and a second end respectively, wherein the first end of the first jaw sleeve and the first end of the second jaw sleeve are coupled to a substantially center area of each jaw from the plurality of jaws, wherein each of the first jaw sleeve and the second jaw sleeve comprises a first hole and a second hole, wherein the first end of the first jaw sleeve and the first end of the second jaw sleeve of the plurality of jaws are hinged with a corresponding pair flanges of the plurality of pair flanges using a hinging component that passes from a first flange of the corresponding pair flanges through the first jaw sleeve and the second jaw sleeve of each corresponding jaw of the plurality of jaws and connects to a second flange of the corresponding pair flanges via the first hole of the first jaw sleeve and the first hole of the second jaw sleeve, wherein each of the plurality of tapered slots is adapted to refrain each corresponding jaw of the plurality of jaws from colliding with the lead screw housing during at least one of a first action and a second action; a plurality of links, wherein each of the plurality of links comprises a hole at a first end and a hole at second end, wherein each of the plurality of links is adapted to link the second end of the first jaw sleeve and the second end of the second jaw sleeve to each of the first end and the second end of a corresponding threaded nut segment from the plurality of threaded nut segments via the hole at the first end and the hole at the second end of a corresponding threaded nut segments using a linking component; and a modular object holding unit having a first end and a second end, wherein the first end of the modular object holding unit comprises an adaptor that is adapted to be fitted at a tapered bottom surface of the bottom end of the lead screw housing, wherein the modular object holding unit comprises: a plurality of plates comprising a first end and a second end, wherein a first plate of the plurality of plates comprises a top surface and a bottom surface, wherein the top surface of the first plate is coupled to a bottom surface of the adaptor; a plurality of linear motion (LM) guides positioned between the first plate and a second plate of the plurality of plates, wherein the first end of a third plate is coupled to the top surface of the first plate; a finger holder coupled to the second end of the third plate, wherein the finger holder comprises a first side and a second side that is opposite to the first side, wherein each of the first side and the second side comprises a hole; and a plurality of fingers, wherein the plurality of fingers comprises a first set of fingers and a second set of fingers that are different from the first set of fingers, wherein a first finger and a second finger from the first set of fingers are adapted to be fitted through the hole of the first side and the second side of the finger holder respectively, wherein a first finger and a second finger from the second set of fingers are coupled to a corresponding guiding rod attached to the second plate, wherein a third finger from the second set of fingers is coupled to a corresponding guiding rod coupled to the third plate, and wherein the plurality of fingers are actuated for grasping and stacking one or more objects such that first set of fingers and the second set of fingers are configured for optimizing object manipulation space.

In an embodiment, the gripper apparatus further comprises a plurality of locking ends, wherein each locking end of the plurality of locking ends form a part of the lead screw housing and extends from the top end through the bottom end of the lead screw housing, wherein each of the plurality of locking ends is adapted to (i) retain a corresponding threaded nut segment in engagement from the plurality of threaded nut segments and (ii) refrain the corresponding threaded nut segment from coming outside the lead screw housing during movement of the corresponding threaded nut segment that is driven by a to and fro motion using a lead screw being operated inside the lead screw housing.

In an embodiment, the gripper apparatus further comprises a plurality of actuators, wherein a first actuator from the plurality of actuators is positioned between the first plate and the second plate such that the first actuator is between the plurality of LM guides, and wherein the first actuator is connected to the first plate and configured to actuate the second set of fingers for movement of the gripper apparatus in a first direction.

In an embodiment, a second actuator from the plurality of actuators is connected to the second plate and a third actuator from the plurality of actuators is connected to the third plate, wherein the second actuator and the third actuator are configured to actuate the second set of fingers for movement of the gripper apparatus in a second direction.

In an embodiment, the first actuator is configured to allow movement and sliding of (i) the second set of fingers (ii) the second actuator and (iii) a bush (920 A) connected to a corresponding guiding rod in the first direction and provide 'x' degree of freedom in the first direction.

In an embodiment, the corresponding guiding rod coupled to the second plate slide along one or more bushes from the plurality of bushes attached thereof for movement, wherein the movement is achieved or actuated using the second actuator to provide a degree of freedom in a second direction.

In an embodiment, a third actuator from the plurality of actuators is connected to the third plate, wherein a guiding rod is connected to the third finger from the second set of fingers in a plane of the first set of fingers, wherein the guiding rod is configured to (i) slide inside a corresponding bush mounted on the third plate and (ii) provide a degree of freedom in the second direction.

In an embodiment, the first set of fingers is a set of fixed fingers.

In an embodiment, the second set of fingers is a set of sliding fingers.

In an embodiment, the plurality of jaws are configured to self-center and lock the adaptor into the tapered bottom surface of the lead screw housing.

In an embodiment, when the lead screw is operated using a motor, the lead screw is configured to move the plurality of threaded nut segments in at least one of (i) an upward direction and (ii) a downward direction.

In an embodiment, based on the movement of the plurality of threaded nut segments, the first end and the second end of each link from the plurality of links rotate from an initial position to a desired position.

In an embodiment, based on the rotation of the first end and the second end of a corresponding link from the plurality of links, each of the plurality of jaws move in a specific direction and lock the adaptor into the tapered bottom surface of the lead screw housing.

In another aspect, there is provided a method for multi object grasping and stacking using a gripper apparatus. The method comprising: receiving information of an object to be grasped from an initial position and to be placed in a desired position, wherein the information comprises size, shape, surface, an orientation of the object, and depth of placement; actuating a plurality of actuators 112 A-C of the gripper apparatus for movement of a plurality of fingers 116 A-E of the gripper apparatus 100 in one or more directions based on the received information; controlling the movement of the plurality of fingers 116 A-E of the gripper apparatus 100 in the one or more directions based on a constant feedback received from one or more cameras; optimizing manipulation space of the object based on the controlled movement of the plurality of fingers 116 A-E of the gripper apparatus 100 in the one or more directions, wherein the manipulation space of the object is optimized by releasing the object such that gap between the object and a past object which is previously grasped and placed by the gripper apparatus 100 is minimum; and iteratively performing above steps until a stack of objects is generated.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
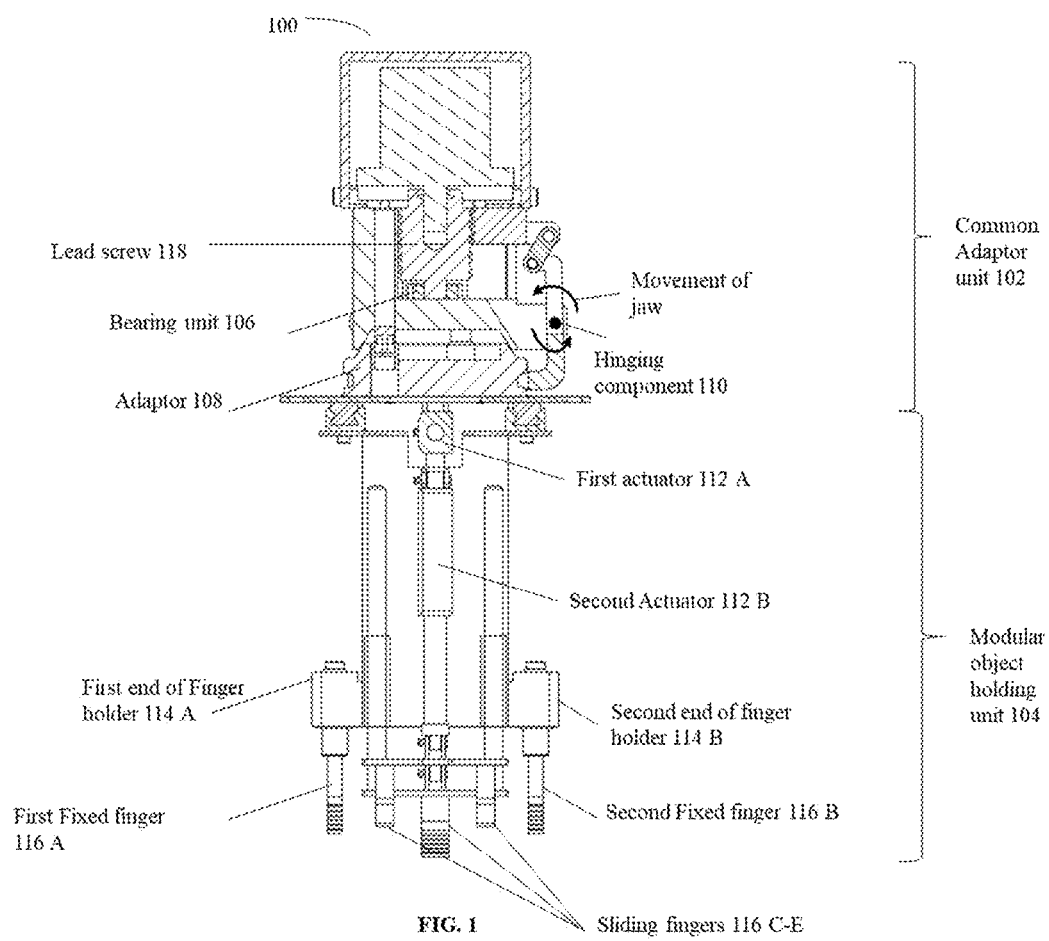
FIG. 1 illustrates a cross sectional view of a gripper apparatus for grasping and placing at least one object, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 18, where similar reference characters denote corresponding features consistently throughout the figures, there are shown preferred embodiments and these embodiments are described in the context of the following exemplary system and/or method.

Reference numerals of one or more components of the gripper apparatus as depicted in the FIGS. 1 through 18 are provided in Table 1 below for ease of description:

TABLE 1

| Sl. No | Component | Numeral reference |
| --- | --- | --- |
| 1 | Gripper apparatus | 100 |
| 2 | Adaptor holding unit | 102 |
| 3 | Modular object holding unit | 104 |
| 4 | Bearing unit | 106 |
| 5 | Adaptor | 108 |
| 6 | A plurality of hinging component | 110 A-C |

TABLE 1-continued

| Sl. No | Component | Numeral reference |
| --- | --- | --- |
| 7 | A plurality of Actuators | 112 A-C |
| 8 | Finger holder | 114 |
| 9 | First end of finger holder | 114 A |
| 10 | Second end of finger holder | 114 B |
| 11 | A plurality of fingers | 116 A-E |
| 12 | Lead screw | 118 |
| 13 | Plurality of threads of lead screw | 704 |
| 14 | Top mounting plate | 202 A |
| 15 | Bottom mounting plate | 202 B |
| 16 | Bottom surface of bottom mounting plate | 222 |
| 17 | A plurality of mounting holes for robot | 206 A-D |
| 18 | Motor | 208 |
| 19 | Lead screw Housing | 210 |
| 20 | Top end of lead screw housing | 220A |
| 21 | Bottom end of lead screw housing | 220B |
| 22 | A plurality of Jaws | 212 A-C |
| 23 | First end of Jaw | 602 A |
| 24 | Second end of Jaw | 602 B |
| 25 | First Jaw sleeve | 604 |
| 26 | Second Jaw sleeve | 606 |
| 27 | First end of first jaw sleeve | 608 |
| 28 | Second end of first jaw sleeve | 610 |
| 29 | First end of second jaw sleeve | 612 |
| 30 | Second end of second jaw sleeve | 614 |
| 31 | First hole of first jaw sleeve | 616 |
| 32 | Second hole of first jaw sleeve | 618 |
| 33 | First hole of second jaw sleeve | 620 |
| 34 | Second hole of second jaw sleeve | 622 |
| 35 | A plurality of Links | 214 A-C |
| 36 | First end of link | 224 A |
| 37 | Second end of link | 224 B |
| 38 | Hole at first end of link | 226 |
| 39 | Hole at second end of link | 228 |
| 40 | A plurality of linking Component | 204 A-C |
| 41 | A plurality of pair Flanges | 216 A-C |
| 42 | A plurality of threaded nut segments | 218 A-C |
| 43 | First end of threaded nut segment | 402 A |
| 44 | Second end of threaded nut segment | 402 B |
| 45 | Hole at first end of threaded nut segment | 706 A |
| 46 | Hole at second end of threaded nut segment | 706 B |
| 47 | A plurality of slots | 302 A-C |
| 48 | Hole of Flanges | 304 A-F |
| 49 | A plurality of tapered slots | 306 A-C |
| 50 | Inner area of bottom surface of lead screw housing | 308 A |
| 51 | Outer Area of area of bottom surface of lead screw housing | 308 B |
| 52 | locating taper | 310 |
| 53 | A plurality locking ends | 312 A-F |
| 54 | A plurality of passages for electric wiring | 314 A-C |
| 55 | First end of modular object holding unit | 902 A |
| 56 | Second end of modular object holding unit | 902 B |
| 57 | A plurality of plates | 904 A-C |
| 58 | First end of first plate | 910 A |
| 59 | Second end of first plate | 910 B |
| 60 | First end of second plate | 912 A |
| 61 | Second end of second plate | 912 B |
| 62 | First end of third plate | 914 A |
| 63 | Second end of third plate | 914 B |
| 64 | A plurality of linear motion (LM) guides | 908 A-B |
| 65 | A plurality of female connectors | 916 A-C |
| 66 | A plurality of guiding rods | 918 A-D |
| 67 | A plurality of bushes | 920 A-D |
| 68 | A plurality of male connectors | 922 A-C |
| 69 | A plurality of fasteners | 924 A-N |

FIG. 1 illustrates a gripper apparatus 100 for gripping at least one object, in accordance with an embodiment of the present disclosure. The gripper apparatus 100 may be referred as 'a gripper', 'a gripping device', 'a modular gripper' and the like and may be interchangeably used herein after. The expression 'at least one object' may be referred as 'profile' and interchangeably used hereinafter. In an embodiment, the expression 'profile' may be referred as objects/items or articles which are produced as a result of extrusion process used in industries such as aluminum industry, steel industry, packaging industries, and/or the like. Further, the 'profile' could be of different complex shapes, size, type, length, and orientation. For example, the 'profile' may include but not limited to a metal rod, a pipe, handles, and boxes of different shapes such as cylindrical, cuboidal, cubical rods, L-shaped and like. The gripper apparatus 100 includes an adaptor holding unit 102 (also referred as 'adapter holding unit 102' and may be interchangeably used hereinafter) comprising a top mounting plate 202 A and a bottom mounting plate 202 B and a modular object holding unit 104 having a first end 902 A and a second end 902 B. The adaptor holding unit 102 is common, fixed and attached always to the gripper apparatus 100. However, the modular object holding unit 104 is available is available in different sizes, such that depending on size and shape of the profile to be handled, appropriate modular object holding unit 104 can be selected and used, and this in turn allows the gripper apparatus 100 to and configured to handle any number of objects with different shapes and varied sizes. Further, the modular object holding unit 104 is attachable or detachable and designed for automation and easy assembly which keeps changing as sizes of the objects vary.

Figure 2:
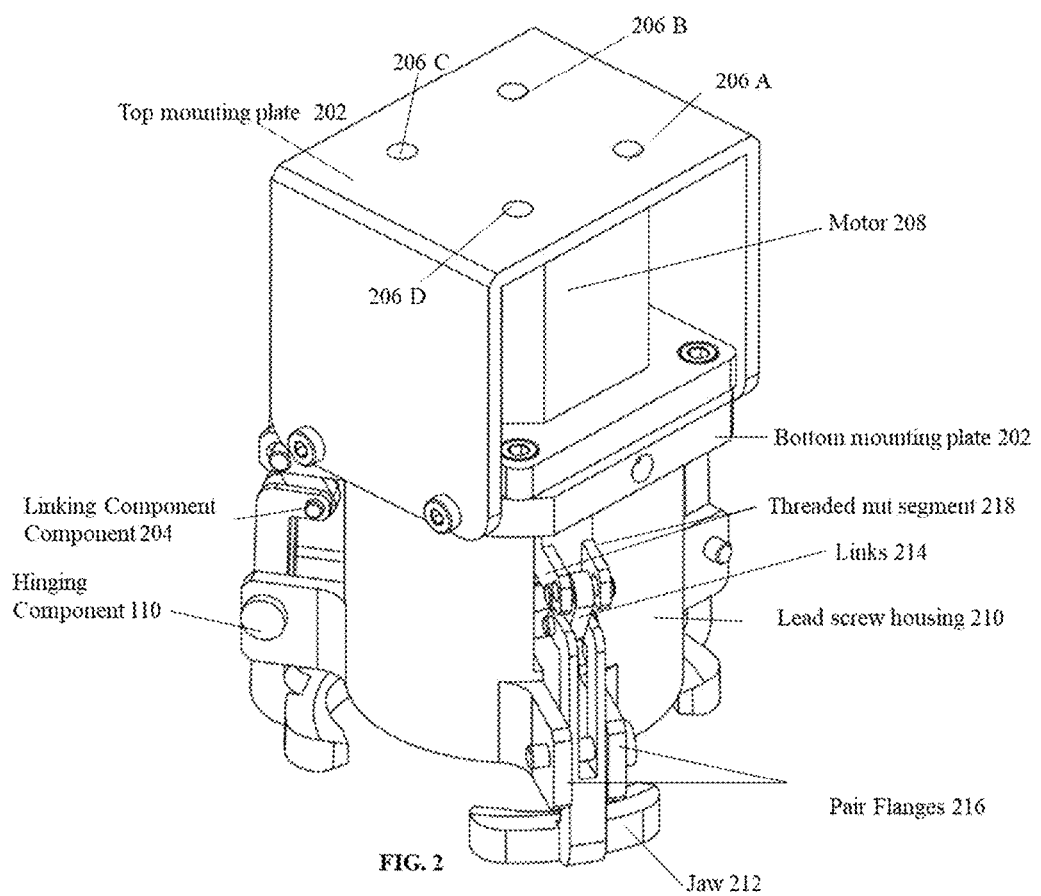
FIG. 2 depicts an isometric view of an adaptor holding unit of the gripper apparatus of FIG. 1, in accordance with an embodiment of the present disclosure.
Figure 3:
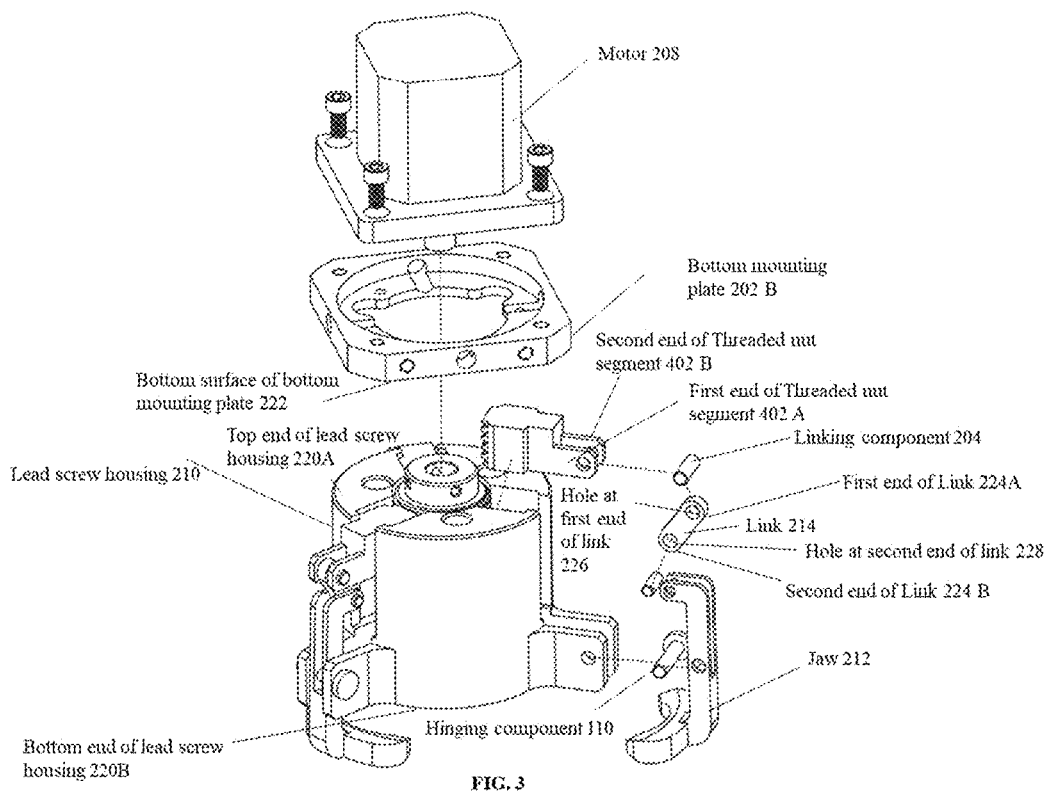
FIG. 3 depicts a partial exploded view of the adaptor holding unit of the gripper apparatus of FIG. 1, in accordance with an embodiment of the present disclosure.

In an embodiment, the gripper apparatus 100 is connected to a robot or an external system via one or more coupling systems (e.g., connectors as known in the art) or input/output interfaces as known in the art. FIG. 2, with reference to FIG. 1, depicts an isometric view of the adaptor holding unit 102 of the gripper apparatus 100 of FIG. 1, in accordance with an embodiment of the present disclosure. As shown in FIG. 2, the top mounting plate 202 of the adaptor holding unit 102 comprises a plurality of mounting holes 206 A-D for robot. The plurality of mounting holes 206 A-D provides a passage for robot as one or more coupling systems to connect the robot with the gripper apparatus 100. FIG. 4, with reference to FIG. 1 and FIG. 2, depicts a partial exploded view of the adaptor holding unit 102 of the gripper apparatus 100 of FIG. 1, in accordance with an embodiment of the present disclosure. As depicted in FIG. 3, the adaptor holding unit 102 further comprises a motor 208, a bearing unit 106, a lead screw 118, a lead screw housing 210, a plurality of threaded nut segments 218 A-C, a plurality of jaws 212 A-C, a plurality of links 214 A-C, a plurality of hinging components 110 A-C, and a plurality of linking components 204 A-C. Further, as shown in FIG. 3, the lead screw housing 210 comprising a top end 220 A and a bottom end 220 B, wherein the top end of the lead screw housing 220A is coupled to a bottom surface 222 of the bottom mounting plate 202B of the adaptor holding unit 102 via a coupling mechanism. In an embodiment, the coupling mechanism could be but not limited to a screw mechanism, fixing mechanism, connectors, and/or the like. The lead screw housing 210 could be made of single casted part.

Figure 4A:
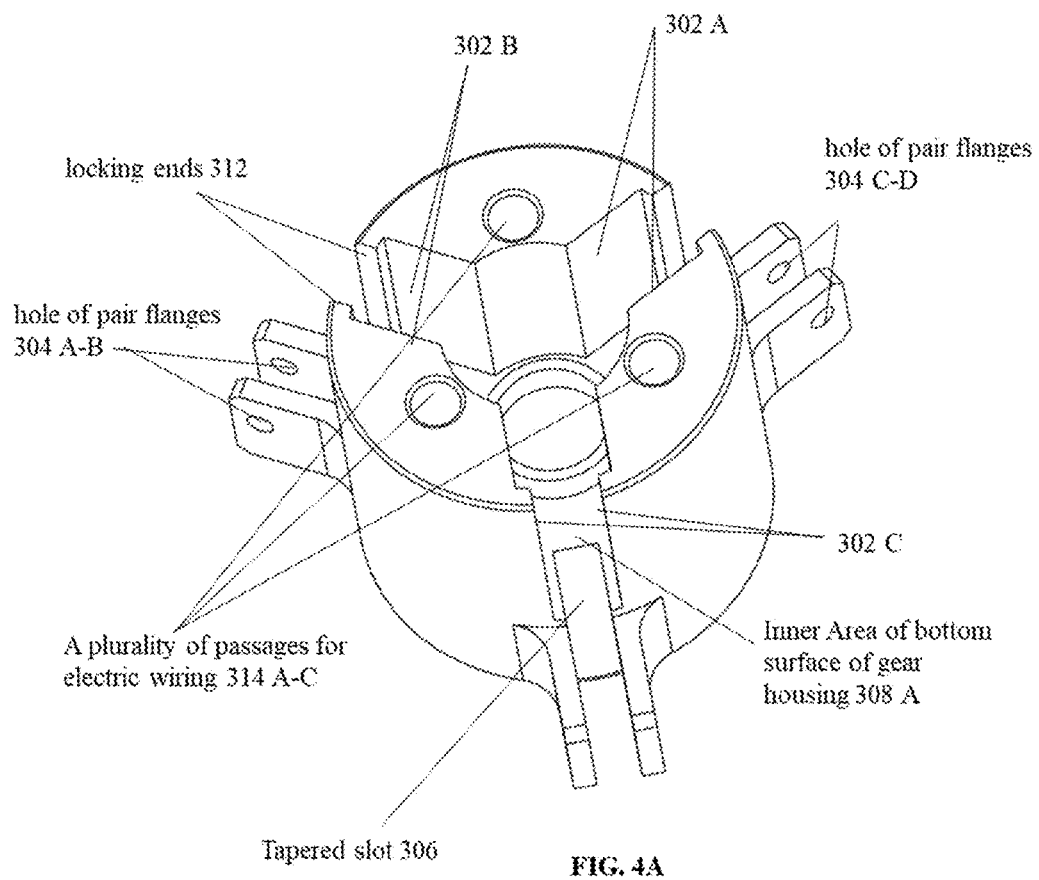
FIGS. 4A and 4B depict a top isometric view and a bottom isometric view respectively of a lead screw housing of the adaptor holding unit of the gripper apparatus of FIG. 1, in accordance with an embodiment of the present disclosure.
Figure 4B:
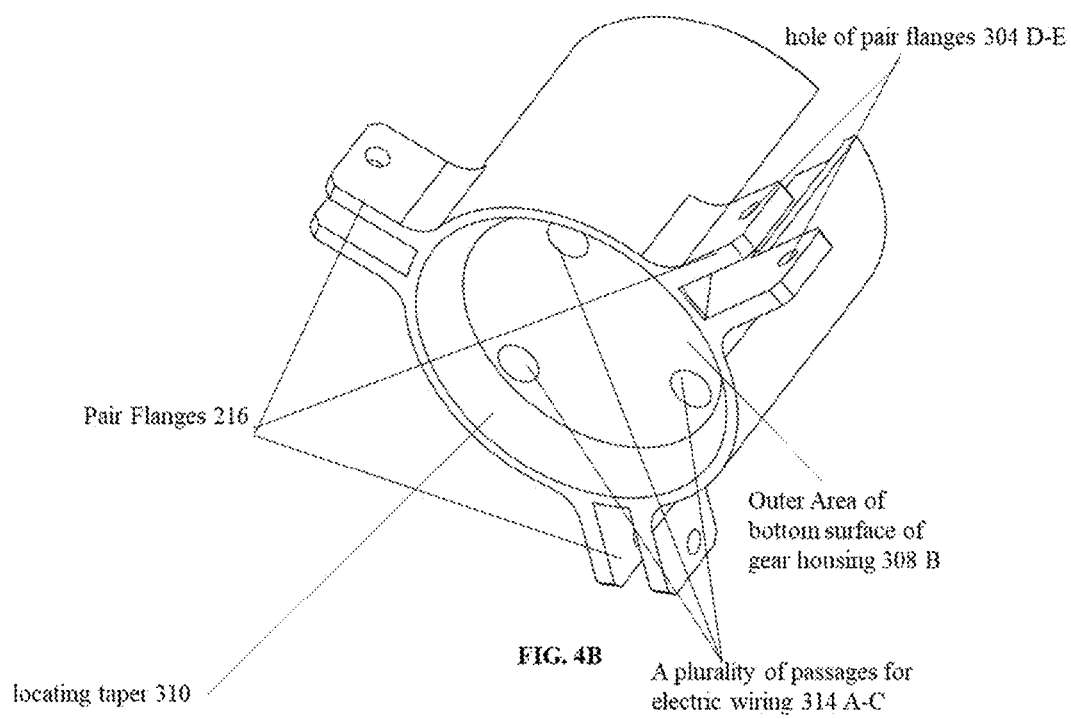

FIGS. 4A and 4B, with reference to FIGS. 1 through 3, depict a top isometric view and a bottom isometric view respectively of the lead screw housing 210 of the adaptor holding unit 102 of the gripper apparatus 100 of FIG. 1, in accordance with an embodiment of the present disclosure. As depicted in FIGS. 4A and 4B, the lead screw housing comprises a plurality of slots 302 A-C, a plurality of pair flanges 216 A-C, and a plurality of tapered slots 306 A-C. Here, the number of elements comprised in the lead screw housing 210 and the adaptor holding unit 102 can vary depending size of the lead screw housing 210 and the adaptor holding unit 102. In an embodiment, each of the plurality of slots is equiangularly positioned from one another and runs through top surface till bottom surface of the lead screw housing 210. This implies that the slots are placed 180-degree, 120-degree, and 90-degree apart from each other when number of the plurality of slots are 2, 3 and 4 respectively, whichever the case may be. Further, each of the plurality of pair flanges 216 A-C is also equiangularly positioned from one another and comprises a corresponding hole. The corresponding holes of each of the plurality of pair flanges are shown in FIGS. 4A and 4B as holes 304 A-B for a first pair flange 216 A, holes 304 C-D for a second pair flange 216 B and holes 304 E-F for a third pair flange 206 C. Further, as shown in FIGS. 4A and 4B, each of the plurality of tapered slots 306 A-C is positioned at at least one corresponding slot from the plurality of slots 302 A-C, wherein each of the plurality of tapered slots 306 A-C is positioned in an inner area of the bottom surface of the lead screw housing 308 A and is protruding towards substantially center area of each corresponding pair of flanges. In other words, there is a gap or an opening between each pair of flanges. Each corresponding tapered slot (e.g., say 306A) is positioned in an inner area of the bottom surface of the lead screw housing 308 A and is protruding towards substantially center area of each corresponding pair of flanges (e.g., 304A-B). The gap or the opening is formed due to placement of each corresponding pair of flanges (e.g., 304A-B) on lower end of, and at peripheral of outer surface of the lead screw housing. In other words, the gap or opening is formed due to position of each corresponding pair of flanges (e.g., 304A-B) that are separated by some distance as per the design requirement and functioning thereof. The gap or the opening is adapted to accommodate at least a part of corresponding tapered slot that is protruding towards the center area of each corresponding pair of flanges (e.g., 304A-B) as shown in FIG. 4.

Figure 5:
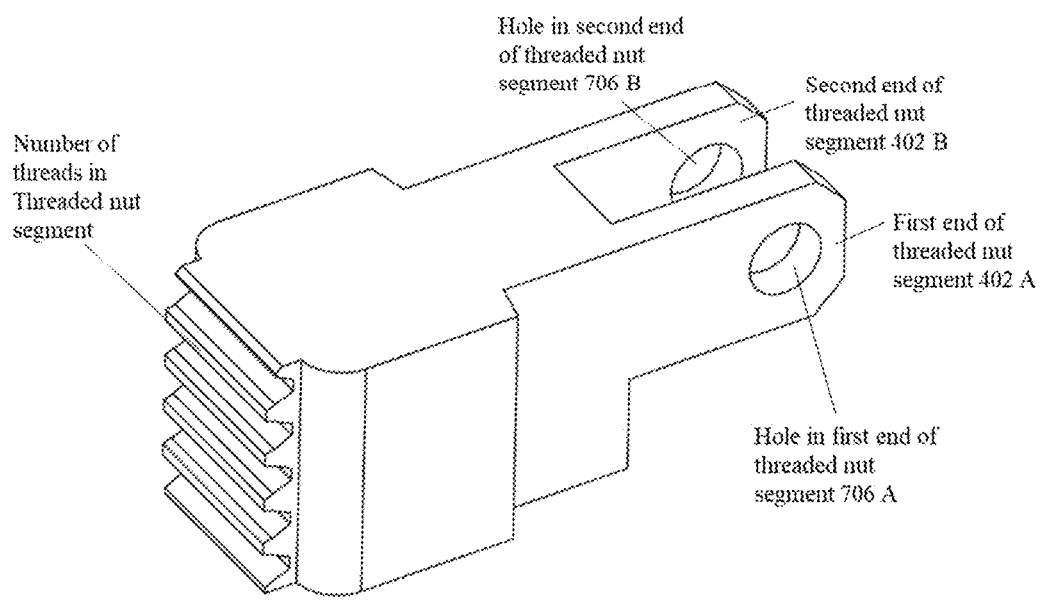
FIG. 5 depict an isometric view of a threaded nut segment comprised in the lead screw housing of the adaptor holding unit of the gripper apparatus of FIG. 1, in accordance with an embodiment of the present disclosure.
Figure 6A:
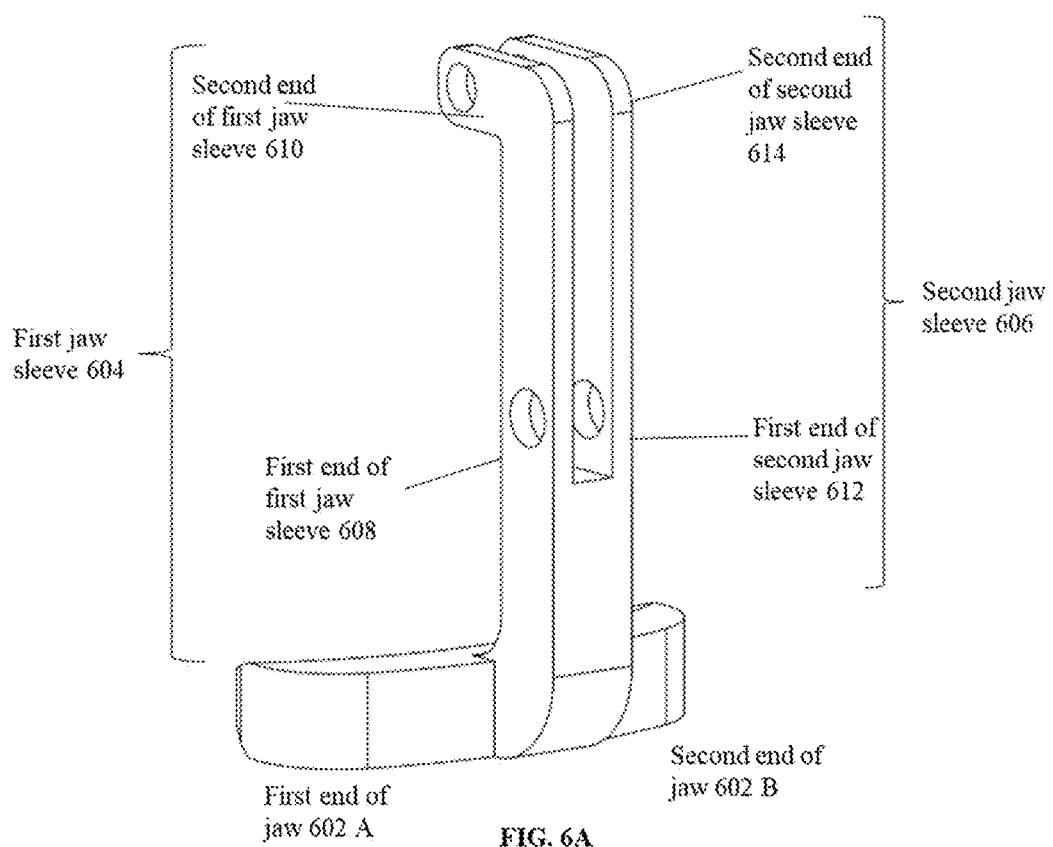
FIGS. 6A and 6B depict a front isometric view and a rear isometric view respectively of a jaw comprised in the adaptor holding unit of the gripper apparatus of FIG. 1, in accordance with an embodiment of the present disclosure.
Figure 6B:
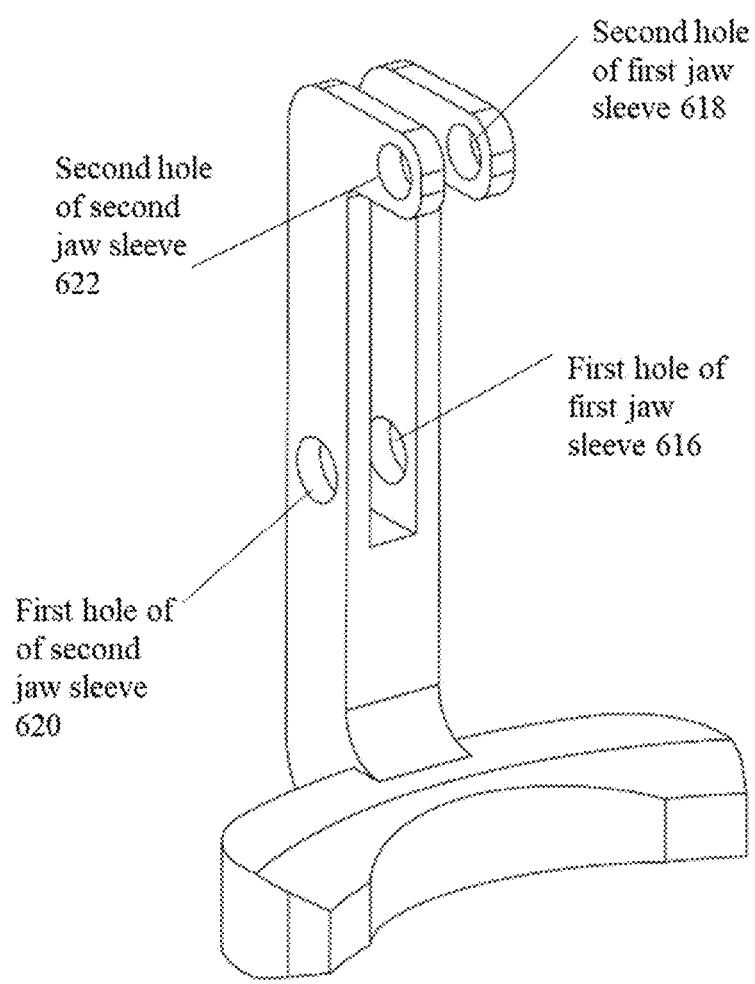

In an embodiment, each of the plurality of threaded nut segments 218 A-C as shown in FIG. 3 is adapted to slide in a corresponding slot of the plurality of slots 302 A-C. FIG. 5, with reference to FIG. 1 through FIG. 4B, depict an isometric view of a threaded nut segment comprised in the lead screw housing of the adaptor holding unit 102 of the gripper apparatus 100 of FIG. 1, in accordance with an embodiment of the present disclosure. As depicted in FIG. 5, each of the plurality of threaded nut segments 218 A-C comprises a first end 402 A and a second end 402 B, wherein each of the first end 402 A and the second end 402 B comprises a hole. With reference to FIG. 5, hole 706 A at first end 402 A of threaded nut segment 218, hole 706 B at second end 402 B of threaded nut segment 218, number of threads in threaded nut segment are shown. In an embodiment, the plurality of jaws 212 A-C as shown in FIG. 3, are further illustrated using FIGS. 6A and 6B. FIGS. 6A and 6B, with reference to FIG. 1 through 3, depict a front isometric view and a rear isometric view respectively of a jaw comprised in the adaptor holding unit 102 of the gripper apparatus of FIG. 1, in accordance with an embodiment of the present disclosure. As shown in FIG. 6A, each of the plurality of jaws 212 A-C comprises a first jaw sleeve 604 and a second jaw sleeve 606 that are positioned at location from a first end 602 A and a second end 602 B of each of the plurality of jaws 212 A-C. However, the gripper apparatus 100 is not limited to the design of the plurality of jaws 212 A-C as shown in the figures and other elements as shown in FIG. 1 and structure can be modified to give other designs of the gripper apparatus 100. Further, as depicted in FIG. 6A, each of the first jaw sleeve 604 and the second jaw sleeve 606 comprises a first end and a second end represented by 608, 610 and 612, 614 respectively. Further, it is shown in FIG. 6A that the first end 608 of the first jaw sleeve 604 and the first end 612 of the second jaw sleeve 606 are coupled to a substantially center area of each jaw from the plurality of jaws 212 A-C. The first end 608 of the first jaw sleeve 604 and the first end 612 of the second jaw sleeve 606 both may serve as a common end wherein the common end is joined at center area of the jaw as shown in FIGS. 6A-6B. Also, each of the first jaw sleeve 604 and the second jaw sleeve 606 comprises a first hole and a second hole, where first hole 616 of the first jaw sleeve 604, second hole 618 of the first jaw sleeve 604, first hole 620 of the second jaw sleeve 606, and second hole 622 of the second jaw sleeve 606 are shown in FIG. 6B. With reference to FIGS. 2 and 3, it is depicted that each of the first jaw sleeve 604 and the second jaw sleeve 606 of the plurality of jaws 212 A-C are hinged with a corresponding pair flanges of the plurality of pair flanges 216 A-C using a hinging component 110. The hinging component 110 that passes from a first flange 216 A of the corresponding pair flanges through the first jaw sleeve 604 and the second jaw sleeve 606 of each corresponding jaw of the plurality of jaws 212 A-C and connects to a second flange 216 B of the corresponding pair flanges via the first hole 616 of the first jaw sleeve 604 and the first hole 620 of the second jaw sleeve 606. Similarly, for other pair of flanges, there is a corresponding hinging component 110 that is positioned or configured with similar arrangement as mentioned above. In an embodiment, the hinging component 110 could be a nut, a connector, a fastener, a screw, and/or the like. In an embodiment, each of the plurality of links 214 A-C as shown in FIG. 3 comprise a hole 226 at a first end 224 A and a hole 228 at second end 224 B. Further, with reference to FIG. 2 and FIG. 3, it is shown that each of the plurality of links (214 A-C) is adapted to link the second end 610 of the first jaw sleeve 604 and the second end 614 of the second jaw sleeve 606 to each of the first end 402 A and the second end 402 B of a corresponding threaded nut segment from the plurality of threaded nut segments 218 A-C via the hole 706 A at the first end 402 A and the hole (706 B) at second end 402 B of a corresponding threaded nut segment 218 using a linking component 204. In an embodiment, the linking component could be a nut, a connector, a fastener, a screw, and the like. Further, the plurality of hinging components 110 A-C and the plurality of linking components 204 A-C could be same or different in terms of shape and size. In an embodiment, each of the plurality of tapered slots 306 A-C as shown in FIG. 4A is adapted to refrain each corresponding jaw of the plurality of jaws 212 A-C from colliding with the lead screw housing 210 during at least one of a first action and a second action. In an embodiment, the first action could be clamping of the modular object holding unit 104 with the adaptor holding unit 102 and the second action could be declamping of the modular object holding unit 104 from the adaptor holding unit 102. Further, the locating taper 310 is provided in the inner area of the bottom surface of the lead screw housing 210 to facilitate easy clamping and declamping by easily locating and clutching the modular object holding unit 104. Further, the lead screw housing comprises a plurality of male type floating connectors 922 A-C which get connected when clamping and de-clamping of the modular object holding unit 104 happens.

Figure 7:
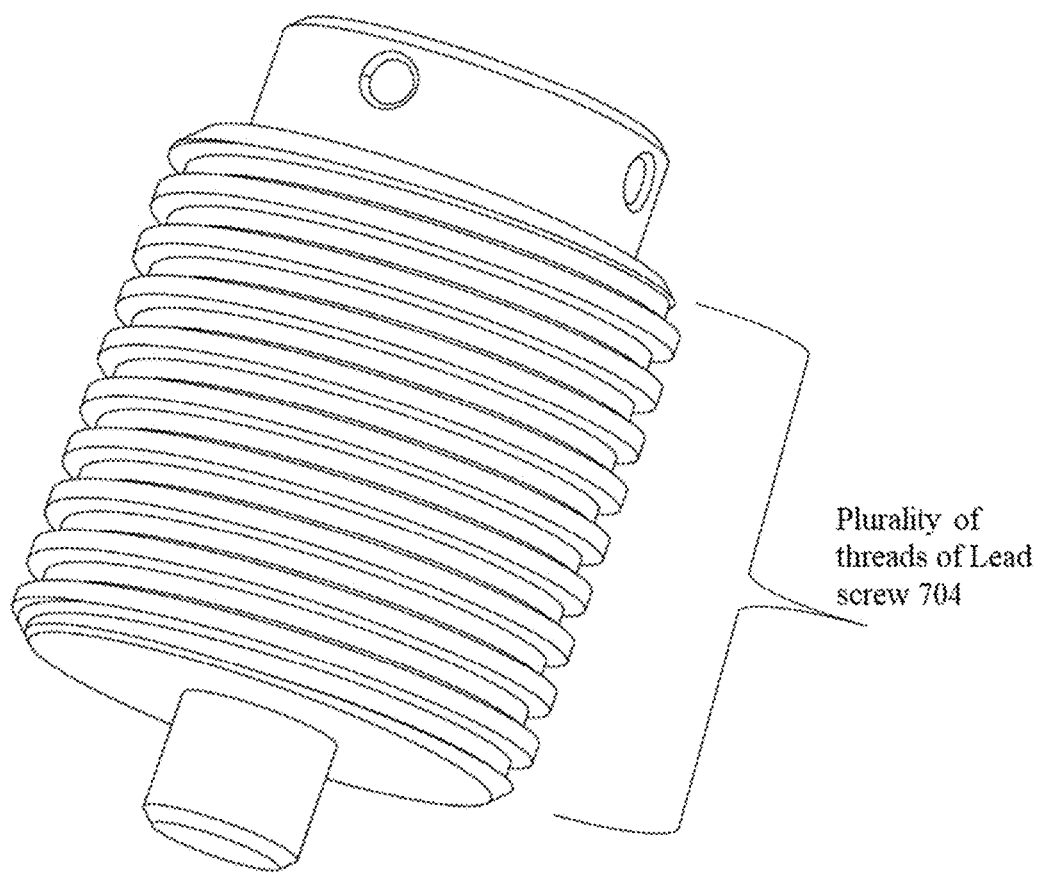
FIG. 7 depict an isometric view of a lead screw comprised in the adaptor holding unit of the gripper apparatus of FIG. 1, in accordance with an embodiment of the present disclosure.

FIG. 7, with reference to FIG. 1, depict an isometric view of the lead screw 118 comprised in the adaptor holding unit 102 of the gripper apparatus 100 of FIG. 1, in accordance with an embodiment of the present disclosure. In an embodiment, the lead screw 118 as shown in FIG. 2, is supported at bottom with the bearing unit 106 and coupled to the motor 208 at the top. The motor 208 is mounted on an upper surface of the bottom mounting plate 202 and is fitted to the lead screw housing 210 using a plurality of fixing components (e.g., screw(s)). The terms 'fixing component' and 'screw' can be interchangeably used hereinafter. The bottom mounting plate 202 has special through hole openings at four locations. These hole openings provide access to assemble the motor 208 with the lead screw 118. The bearing unit 106 is configured to take all side forces and axial loading on the lead screw 118. In an embodiment, as shown in FIG. 3, a plurality of locking ends 312 A-F are provided in the lead screw housing 210, wherein each locking end of the plurality of locking ends 312 A-F form part of the lead screw housing 210 and extend from the top end 220 A through the bottom end 220 B of the lead screw housing 210. Further, each of the plurality of locking ends 312 A-F is adapted to (i) retain a corresponding threaded nut segment in engagement from the plurality of threaded nut segments 218 A-C and (ii) refrain the corresponding threaded nut segment from coming outside the lead screw housing 210 during movement of the corresponding threaded nut segment that is driven by to and fro motion using a lead screw 118 being operated inside the lead screw housing 210. In other words, the plurality of threaded nut segments 218 A-C are engaged with lead screw 118 and retained by the plurality of locking ends 312 A-F in the lead screw housing 210 to prevent it from coming out.

Figure 8:
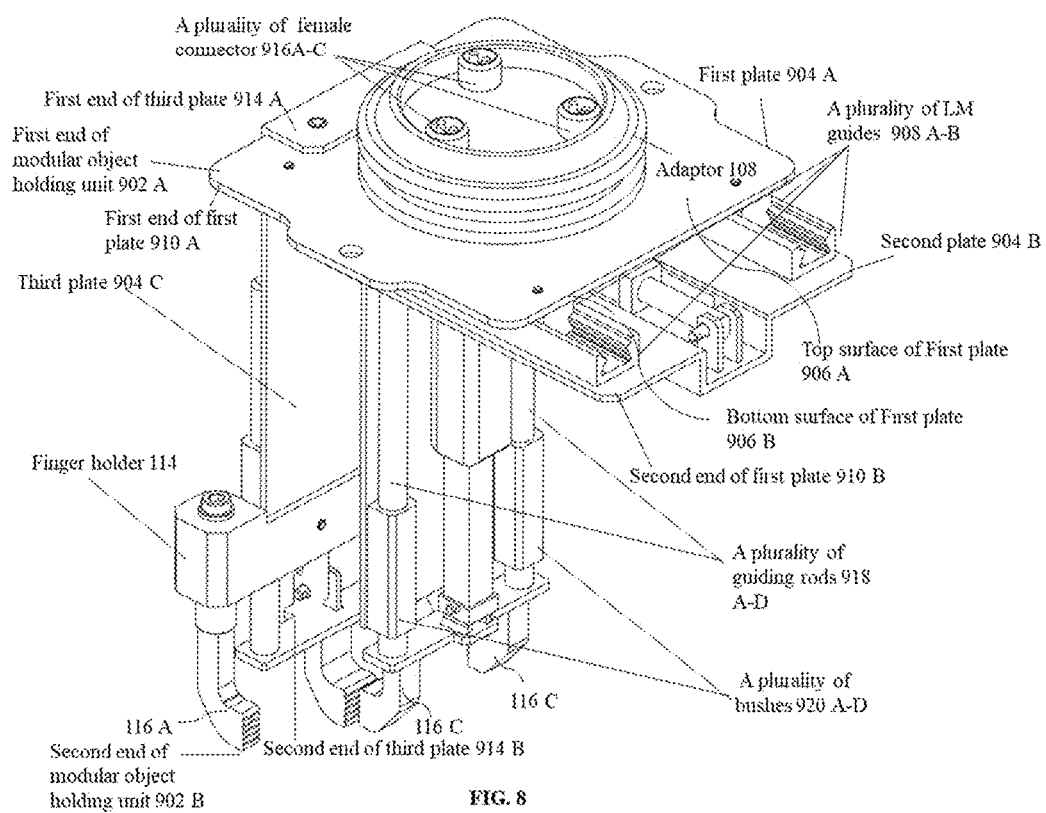
FIG. 8 depicts a first isometric view of a modular object holding unit of the gripper apparatus of FIG. 1, in accordance with an embodiment of the present disclosure.
Figure 9A:
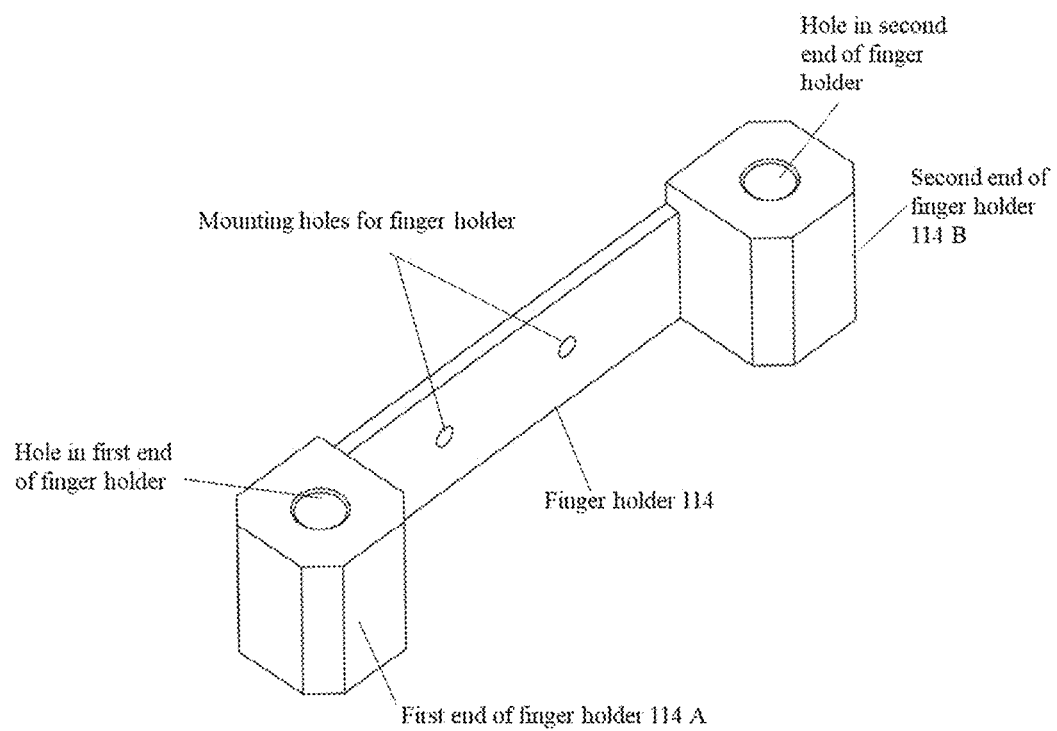
FIGS. 9A and 9B depict a first isometric view and a second isometric view respectively of a finger holder comprised in the modular object holding unit of the gripper apparatus of FIG. 1, in accordance with an embodiment of the present disclosure.
Figure 9B:
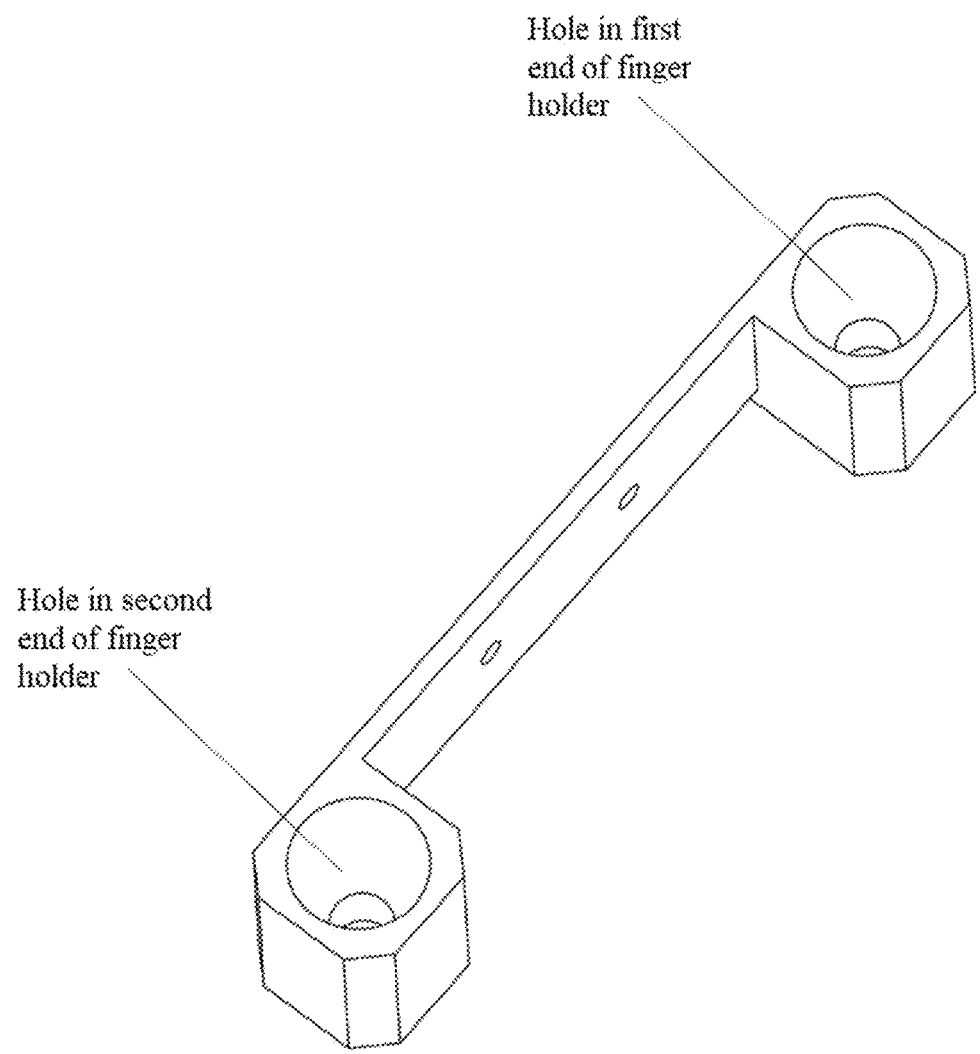

The modular object holding unit 104 of the gripper apparatus 100 of FIG. 1 is further explained with the help of FIGS. 8 through 13. Here, FIG. 8, with reference to FIG. 1, depicts a first isometric view of a modular object holding unit 104 of the gripper apparatus 100 of FIG. 1, in accordance with an embodiment of the present disclosure. As can be seen in FIG. 1, the modular object holding unit 104 having a first end 902 A and a second end 902 B is provided. Further, it is depicted in FIG. 8 that the first end 902 of the modular object holding unit 104 comprises an adaptor 108 that is adapted to be fitted at a tapered bottom surface of the bottom end 220 B of the lead screw housing 210. As can be seen in FIG. 8, the modular object holding unit 104 comprises a plurality of plates 904 A-C, each plate from the plurality of plates 904A-C comprises a first end and a second end. A first plate 904 A of the plurality of plates 904 A-C comprises a top surface 906 A and a bottom surface 906 B. The top surface of the first plate 906 A is coupled to a bottom surface of the adaptor 108. The modular object holding unit 104 further comprises a plurality of linear motion (LM) guides 908 A-B positioned between the first plate 904 A and a second plate 904 B of the plurality of plates 904A-C. Here, the first end 914 A of a third plate 904 C is coupled to the top surface of the first plate 904 A. In an embodiment, the first plate 904 A may be referred as a top plate, the second plate 904 B may be referred as a L-plate, and the third plate 904 C may be referred as a vertical plate and may be interchangeably used hereinafter. In an embodiment, the top plate 904 A of the gripper apparatus 100 houses/accommodates other parts. The vertical plate 904 C is connected to the top plate 904 A with screws. The L plate is connected on the plurality of LM guides 908 A-B and also connected/coupled/attached to the first plate 904 A via fixing component. The plurality of LM guides 908 A-B are rigidly screwed to the top plate 904 A from bottom and a rail is rigidly connected to the L-plate 904 B. Further, the modular object holding unit 104 comprise a finger holder 114 coupled to the second end 914 B of the third plate 904 C, and a plurality of fingers 116 A-E (also shown in FIG. 10). The plurality of fingers 116 A-E comprises a first set of fingers 116 A-B and a second set of fingers 116 C-E that are different from the first set of fingers 116 A-B. In an embodiment, the first set of fingers 116 A-B is a set of fixed fingers and wherein the second set of fingers 116 C-E is a set of sliding fingers. In other words, the second set of fingers 116 C-E are configured to slide from one position to desired position accordingly for object manipulation and grasping them firmly thereof, in an embodiment of the present disclosure. For instance, the second set of fingers 116 C-E are slidable in nature and can be adjusted accordingly for object manipulation and grasping them firmly thereof, in an embodiment of the present disclosure. FIGS. 9A and 9B depict a first isometric view and a second isometric view respectively of the finger holder 114 comprised in the modular object holding unit 104 of the gripper apparatus 100 of FIG. 1, in accordance with an embodiment of the present disclosure. As depicted in FIGS. 9A and 9B, the finger holder 114 comprises a first side 114 A, and a second side 114 B that is opposite to the first side 114 A. Each of the first side 114 A and the second side 114 B comprises a corresponding hole. In an embodiment, a first finger 116 A and a second finger 116 B from the first set of fingers 116 A-B are adapted to be fitted through the hole of the first side 114 A and the second side 114 B of the finger holder 114 respectively. In an embodiment, the first set of fingers 116 A-B (fixed fingers) vary in accordance with range/size of the object which is handled by the gripper apparatus 100. This implies that the modular object holding unit 104 may have different fixed fingers for different objects. Further, tip of the plurality of fingers 116 A-E are made with a plurality of serrations on gripping face. The plurality of serrations improve gripping capacity of the gripper apparatus 100 and also ensure that there are no marks/scratches on the object to be gripped by the gripper apparatus 100 during manipulation.

Figure 10:
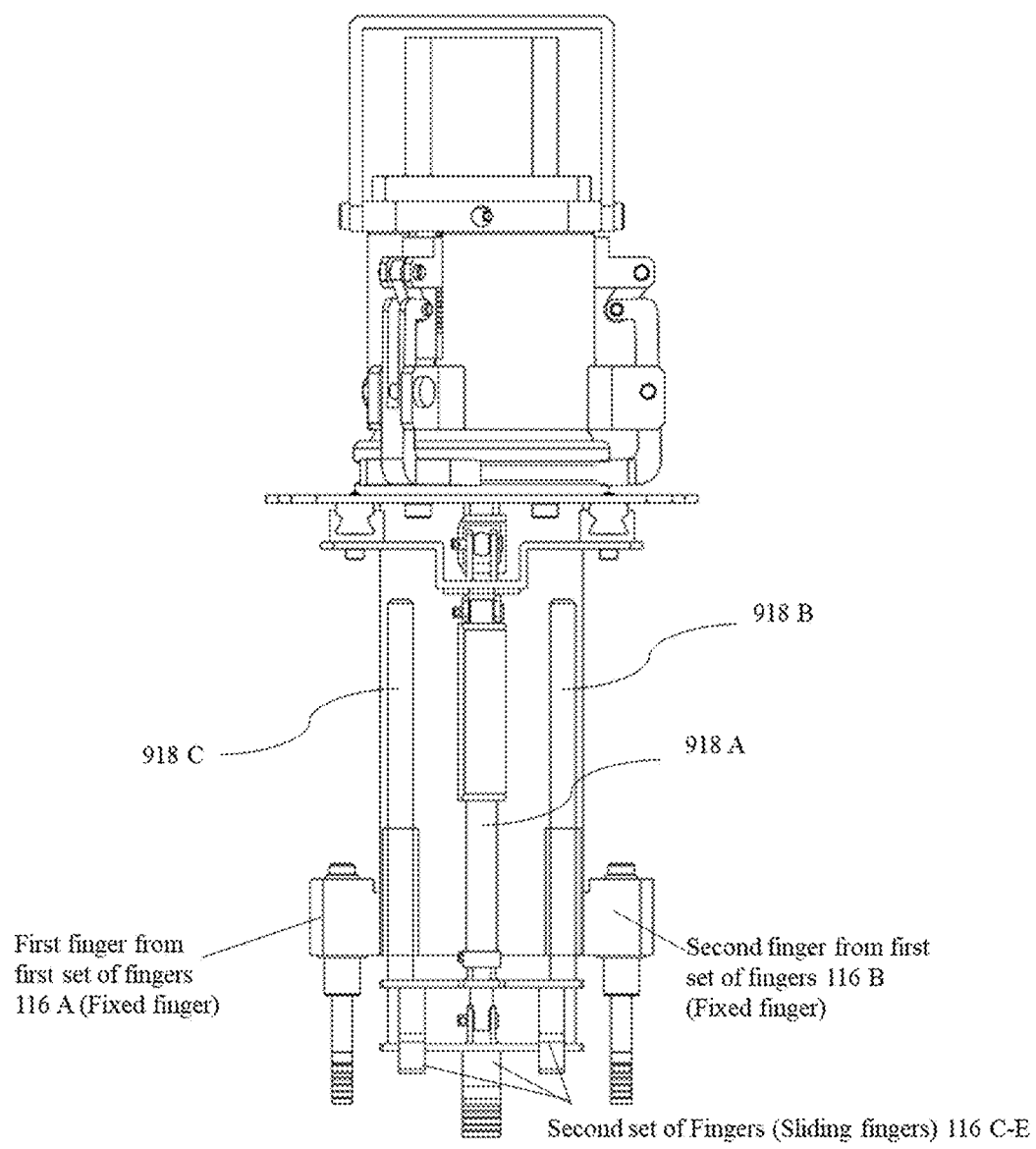
FIG. 10 depicts a front view of the modular object holding unit of the gripper apparatus of FIG. 1, in accordance with an embodiment of the present disclosure.
Figure 11:
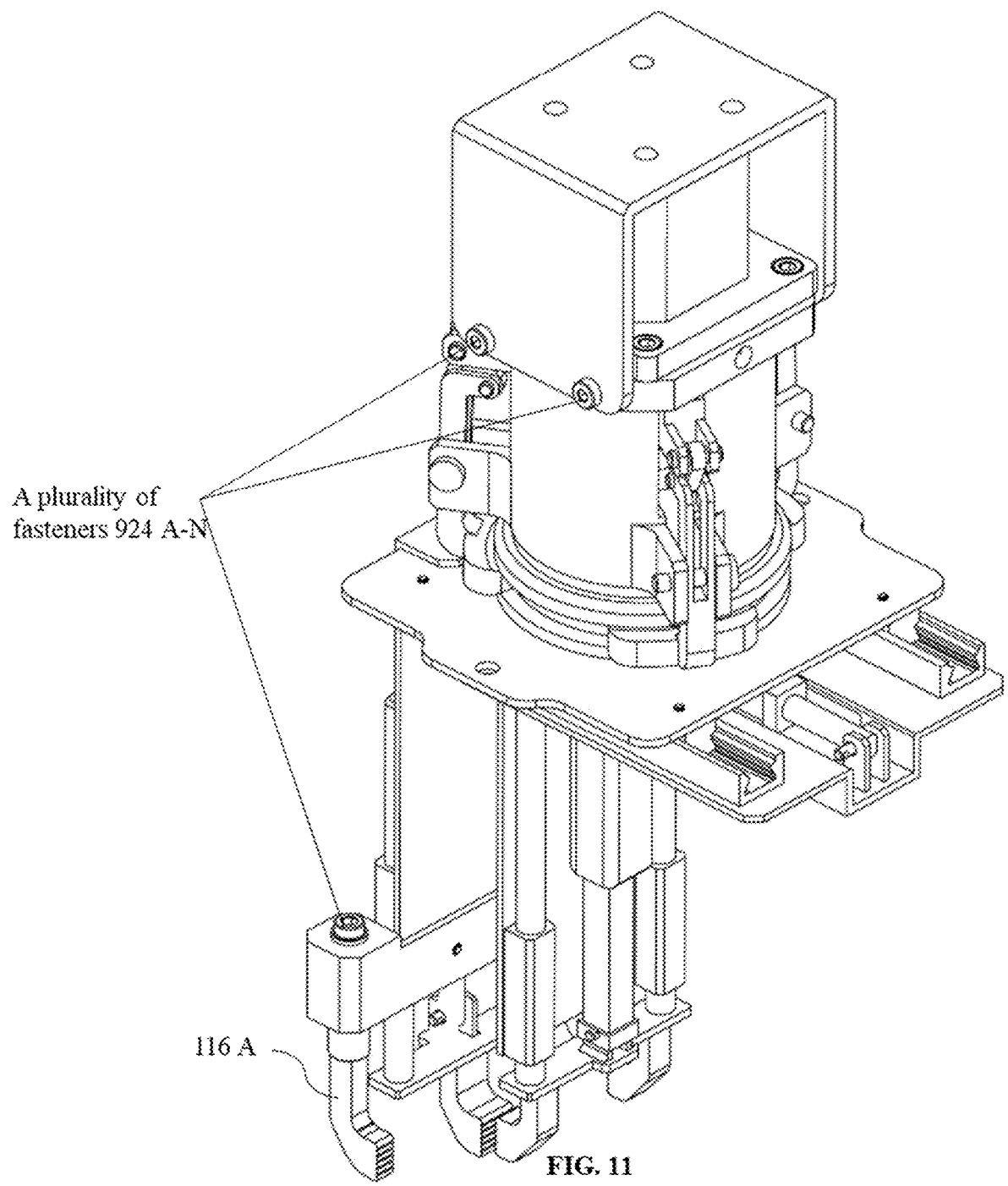
FIG. 11 depicts a second isometric view of the modular object holding unit of the gripper apparatus of FIG. 1, in accordance with an embodiment of the present disclosure.
Figure 12:
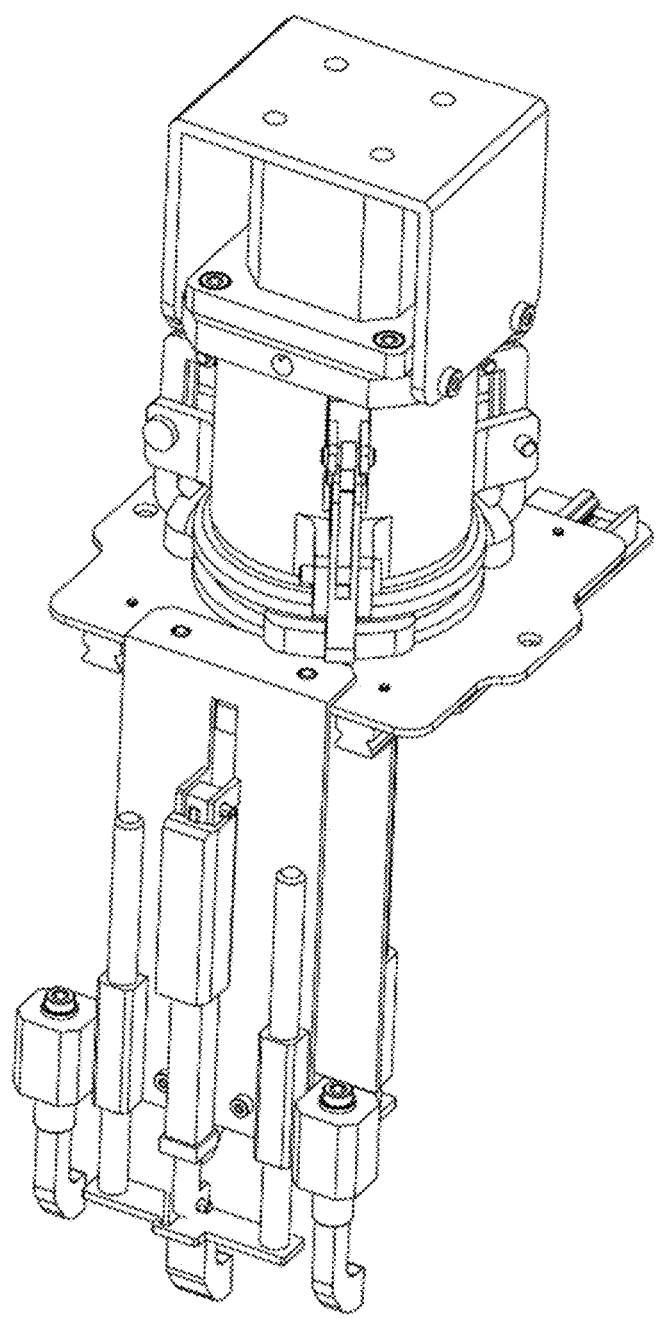
FIG. 12 depicts a rear isometric view of a modular object holding unit of the gripper apparatus of FIG. 1, in accordance with an embodiment of the present disclosure.

FIG. 10 depicts a front view of the modular object holding unit 104 of the gripper apparatus 100 of FIG. 1, in accordance with an embodiment of the present disclosure. As shown in FIG. 8 and FIG. 10, a first finger 116 C and a second finger 116 D from the second set of fingers 116 C-E are coupled to a corresponding guiding rod 918 A attached to the second plate 904 B, A third finger 116 E from the second set of fingers 116 C-E is coupled to a corresponding guiding rod 918 B coupled to the third plate 904 C. In an embodiment, the modular object holding unit 104 of the gripper apparatus 100 further comprises a plurality of actuators 112 A-C, wherein a first actuator 112 A is positioned between the first plate 904 A and the second plate 904 B such that the first actuator 112 A is between the plurality of LM guides 908 A-B, The first actuator 112 A is connected to the first plate (904 A) and configured to actuate the second set of fingers 116 C-E for movement of the gripper apparatus 100 in a first direction (e.g., X-direction). FIG. 11 depicts a second isometric view of the modular object holding unit 104 of the gripper apparatus 100 of FIG. 1, in accordance with an embodiment of the present disclosure. As can be seen in FIG. 11, a plurality of fasteners 924 A-N are used for interconnection purpose. FIG. 12 depicts a rear isometric view of the modular object holding unit 104 of the gripper apparatus 100 of FIG. 1, in accordance with an embodiment of the present disclosure.

Figure 13:
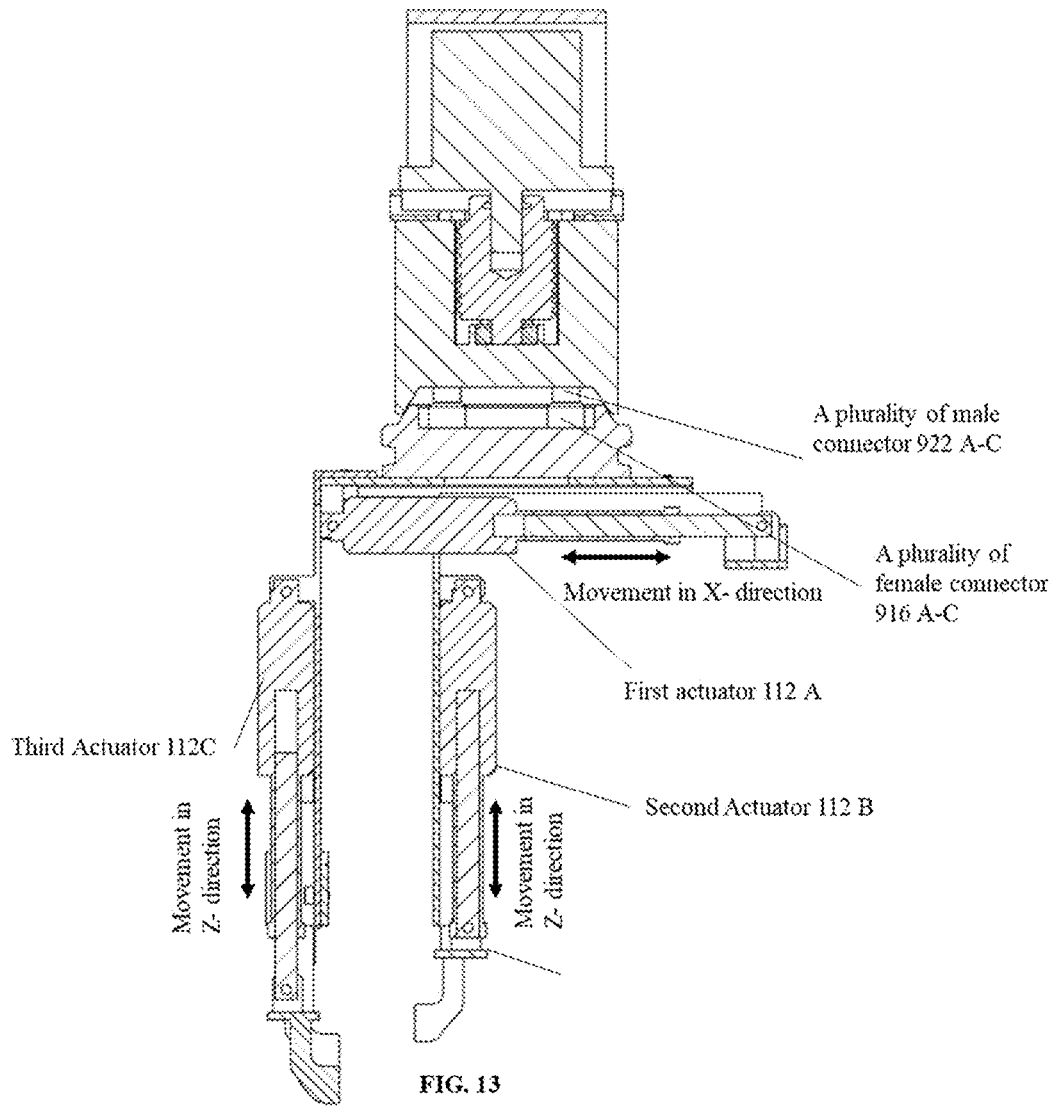
FIG. 13 depicts a cross sectional view of the modular object holding unit of the gripper apparatus of FIG. 1, in accordance with an embodiment of the present disclosure.

In an embodiment, the plurality of fingers 116 C-E are actuated for grasping and stacking one or more objects such that first set of fingers 116 A-B and the second set of fingers 116 C-E are configured for optimizing object manipulation space. FIG. 13 depicts a cross sectional view of the modular object holding unit 104 of the gripper apparatus 100 of FIG. 1, in accordance with an embodiment of the present disclosure. As depicted in FIG. 13, the modular object holding unit 104 of the gripper apparatus 100 comprises a plurality of actuators 112 A-C, wherein a first actuator 112 A is positioned between the first plate 904 A and the second plate 904 B such that the first actuator 112 A is between the plurality of LM guides 908 A-B. In an embodiment, the plurality of actuators may include but not limited to electric actuators, hydraulic actuators, pneumatic actuators, combinations thereof, and/or the like. Further, the first actuator 112 A is connected to the first plate 904 A and configured to actuate the second set of fingers 116 C-E for movement of the gripper apparatus 100 in a first direction. Similarly, a second actuator 112 B from the plurality of actuators 112 A-C is connected to the second plate 904 B and a third actuator 112 C is connected to the third plate 904 C, The second actuator 112 B and the third actuator 112 C are configured to actuate the second set of fingers 116 C-E for movement of the gripper apparatus 100 in a second direction (e.g., Z-direction). In other words, the modular object holding unit 104 comprises of three electric actuators, out of which a first actuator 112 A (say 'Actuator 1') is connected in between the top plate 904 A and the L-plate 904 B and a second actuator 112 B (say 'Actuator 2') is connected to the L-plate 904 B and a third actuator 112 C (say 'Actuator 3') is connected to the vertical plate 904 C. These actuators collectively provide two degree of freedom (DOF) of motion to the gripper apparatus 100 along a first direction and a second direction say X and Z axis directions respectively as shown in FIG. 13. An additional rotary axis could be given by the robot itself. Thus, the gripper apparatus 100 provides three degree of freedom (DOF).

In an embodiment, the first actuator 112 A is configured to allow movement and sliding of (i) the second set of fingers 116 C-E, (ii) the second actuator 112 B and (iii) a bush 920 A connected to a corresponding guiding rod in the first direction and provide 'x' degree of freedom in the first direction (e.g., X-direction). Further, the corresponding guiding rod coupled to the second plate 904 B slides along one or more bushes from the plurality of bushes 920 A-D attached thereof for movement, wherein the movement is achieved or actuated using the second actuator 112 B to provide a degree of freedom in a second direction (e.g., Z-direction). Furthermore, a third actuator 112 C from the plurality of actuators 112 A-C is connected to the third plate 904 C, A guiding rod 918 A is connected to the third finger 116 C from the second set of fingers 116 C-E in a plane of the first set of fingers 116 A-B, The guiding rod 918 A is configured to (i) slide inside a corresponding bush mounted on the third plate 904 C and (ii) provide a degree of freedom in the second direction (e.g., Z-direction). In other words, since the first actuator 112 A (say 'Actuator 1') is fixed at top plate 904 A from bottom at one end and another end it is connected to the L-plate 904 B. The first actuator 112 A (say 'Actuator 1'), the whole unit including L-plate 904 B with second actuator 112 B (say 'Actuator 2') and the second set of fingers 116 C-E (sliding fingers) slide to a horizontal direction providing 1 degree of freedom (DOF) of motion along X axis. Further, L-plate 904 B has two bushes mounted on it. One end of the guiding rods 918 B-C slide along these bushes 920 A-B with help of second actuator 112 B (say 'Actuator 2') and other end of the guiding rods 918 B-C are connected to the second set of fingers 116 C-E (sliding fingers). This sliding mechanism gives one more degree of freedom (DOF) of motion in Z direction. Furthermore, the third actuator 112 C, (say 'Actuator 3'), is connected to the vertical plate 904 C at one end and end of a corresponding guiding rod is connected to the second set of fingers 116 C-E (sliding fingers). This corresponding guiding rod slides inside the bush 920 D provided on vertical plate 904 C. the third actuator 112 C (say 'Actuator 3') provides one degree of freedom (DOF) of motion in Z direction only.

In an embodiment, the modular object holding unit 104 of the gripper apparatus 100 may be adapted to be replaced with another modular object holding unit in accordance with varied sizes of the objects to be handled by the gripper apparatus 100, However, the adaptor holding unit 102 is fixed to the robot end and acts as common unit for the gripper apparatus 100. Further, a platform is provided (not shown in the figures) where different modular object holding units for a set of different ranges of the objects are placed. All the modular object holding units are design for assembly and design for automation. As per the requirement by automation system, the adaptor holding unit 102 is configured to select required modular object holding unit from the platform which provides a flexibility to handle different type of objects from smaller to larger one, but design of all of the modular object holding units remains same. For example, for smaller object size range of 50 mm to 100 mm, a first type of modular object holding unit is used. Further, for medium object size range from 100 mm to 200 mm, a second type of modular object holding unit is used. Similarly, for larger object size range from 200 mm to 500 mm, a third type of modular object holding unit is used. Due to these features, the adaptor holding unit 102 of the gripper apparatus 100 can easily clamp or de-clamp the modular object holding unit 104 of the gripper apparatus 100.

Figure 14:
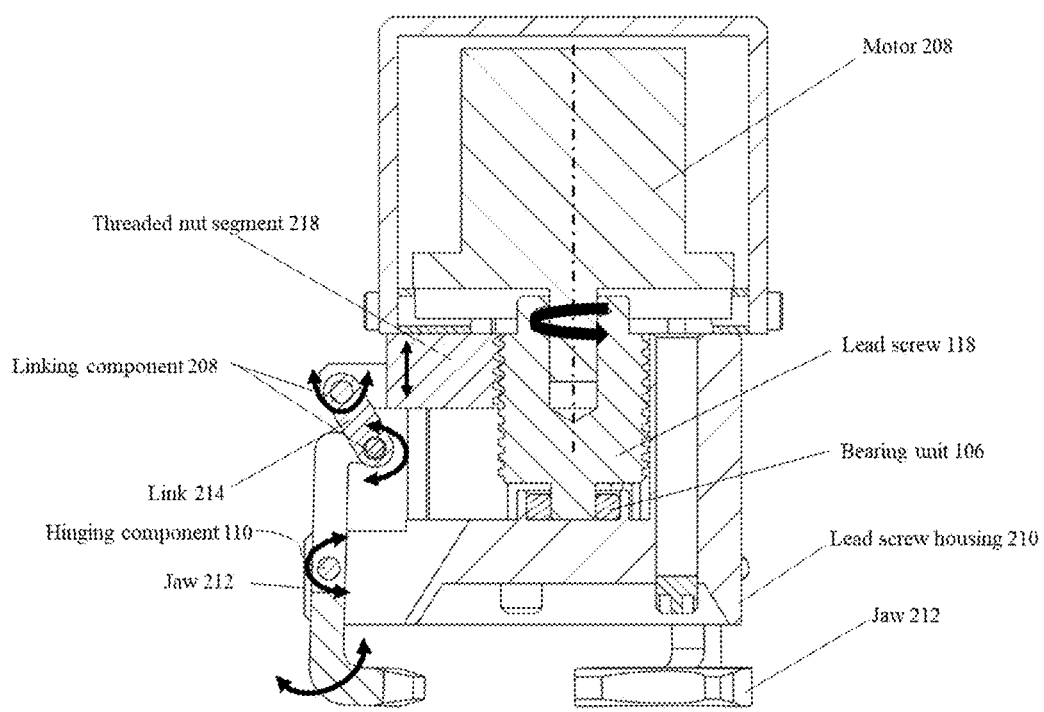
FIG. 14 depicts a cross sectional view of the adaptor holding unit of the gripper apparatus of FIG. 1, in accordance with an embodiment of the present disclosure.

In an embodiment, the clamping and de-clamping action of the modular object holding unit 104 of the gripper apparatus 100 is depicted in FIG. 14. FIG. 14 depicts a cross sectional view of the adaptor holding unit 102 of the gripper apparatus 100 of FIG. 1, in accordance with an embodiment of the present disclosure. As depicted in FIG. 14, actuation of the gripper apparatus 100 starts when the motor 208 is energized. The energized motor coupled with the lead screw 118 makes it revolve. When the lead screw 118 is operated using the motor 208, the lead screw 118 is configured to move the plurality of threaded nut segments 218 A-C in at least one of (i) an upward direction and (ii) a downward direction in accordance with the direction of revolution of the lead screw 118. Further, based on the movement of the plurality of threaded nut segments 218 A-C, the first end 224 A and the second end 224 B of each of the link from the plurality of links 214 A-C rotate from an initial position to a desired position. In an embodiment, the first end 224 A and the second end 224 B of each of the link from the plurality of links 214 A-C rotate from an initial position to a desired position with reference to the linking component 204 and the hinging component 110. Further, based on the rotation of the first end 224 A and second end 224 B of each of the link from the plurality of links 214 A-C, each of the plurality of jaws 212 A-C move in a specific direction and lock the adaptor 108 into the tapered bottom surface 308 A of the lead screw housing 210. As can be seen in FIG. 14, one end of the threaded nut segment 218 is connected to the jaw 212 with the help of the link 214 using the hinging component 110 and the linking component 204, thereby the jaw 212 can only revolve around that certain point hence providing it with only 1 degree of freedom. For example, function of the jaw 212 is to clamp the adaptor holding unit 102 to the modular object holding unit 104. A tapered shaped step is machined around the adaptor 108. This tapered shape step helps the plurality of jaws 212 A-C to easily enter the plurality of tapered slots 306 A-C, thus clamping it to form positive locking between the adaptor holding unit 102 and the modular object holding unit 104. The movement of the plurality of threaded nut segments 218 A-C determine position of the plurality of jaws 212 A-C which in turn determine the clamping action and de-clamping action of the modular object holding unit 104. For instance, as shown in FIG. 14, when the threaded nut segment 218 is at uppermost position, then the corresponding link 214 is at its initial position (e.g., home position) and the jaw 212 revolves around corresponding hinging point in such a way that the jaw 212 moves inside the tapered shaped slot provided in the modular object holding unit 104 hence clamping the adaptor 108 with the modular object holding unit 104. Similarly, when the threaded nut segment 218 moves down, the corresponding link 214 experiences a relative inward motion and moves inside the plurality of tapered slots 306 A-C of the lead screw housing 210. The movement of the link 214 makes the jaw 212 revolve around the hinging point and leads to the de-clamping action of the adaptor 108 of modular object holding unit 104. In an embodiment, the plurality of jaws 212 A-C are configured to self-center and lock the adaptor 108 into the tapered bottom surface 308 B of the lead screw housing 210. In other words, design of the plurality of jaws 212 A-C is such that it should be adapted to locate into the slots provided in the adaptor 108 and fits into them. Tip of the plurality of jaws 212 A-C at bottom are made tapered and curve in shape so that they can easily fit into the slots (e.g., threaded slots wherein the jaws fitting into these threaded slots is depicted in FIG. 12 as an example embodiment) provided in the adaptor 108. In an embodiment, the adaptor 108 is connected in between the modular object holding unit 104 and the adaptor holding unit 102. The adaptor 108 comprises a plurality of female connectors 916 A-C (alternatively referred as female type floating connectors) embodied in it. However, the lead screw housing 210 comprises a plurality of male connectors 922 A-C (alternatively referred as male type floating connectors) which get connected when clamping and de-clamping of the gripper apparatus 100 happens. For easy clamping and de-clamping, the plurality of locating tapers 310 A-C are provided both in the adaptor 108 and the lead screw housing 210.

Figure 15A:
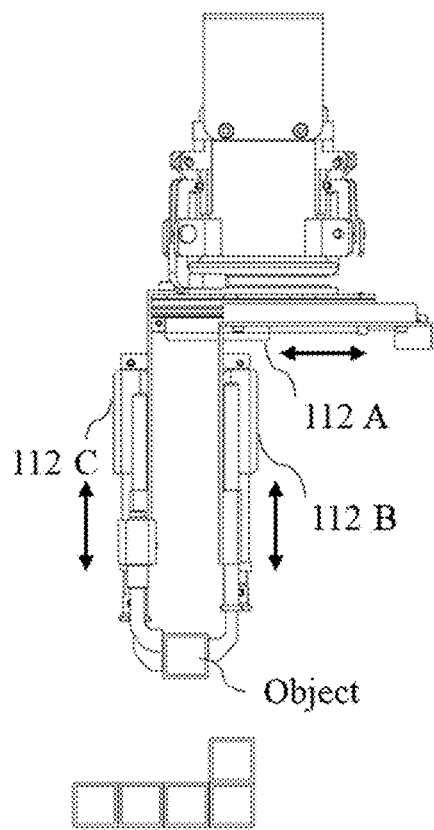
FIGS. 15A through 15E depict a working example of the gripper apparatus of FIG. 1 that grasps and place the at least one object for object manipulation space optimization, in accordance with an embodiment of the present disclosure.
Figure 15B:
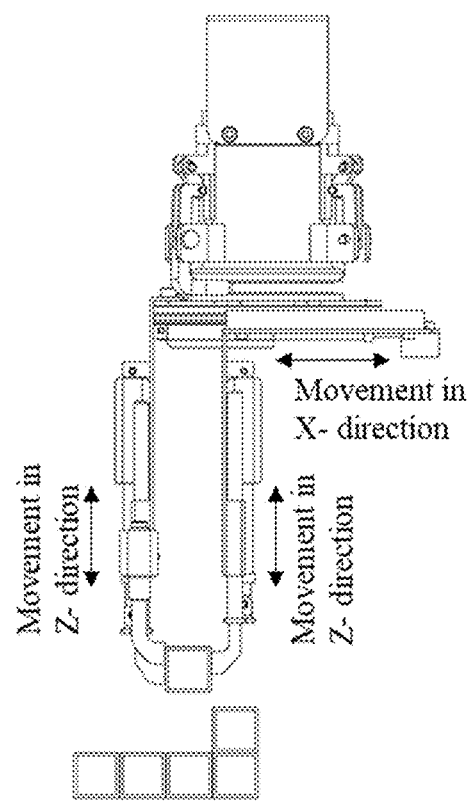
Figure 15C:
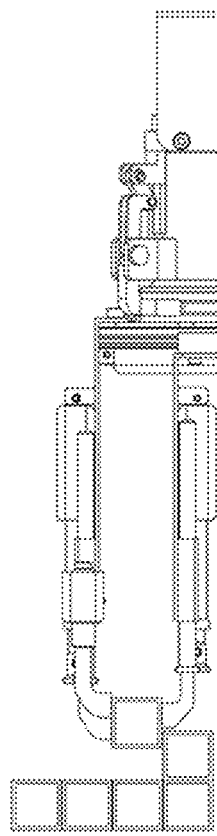
Figure 15D:
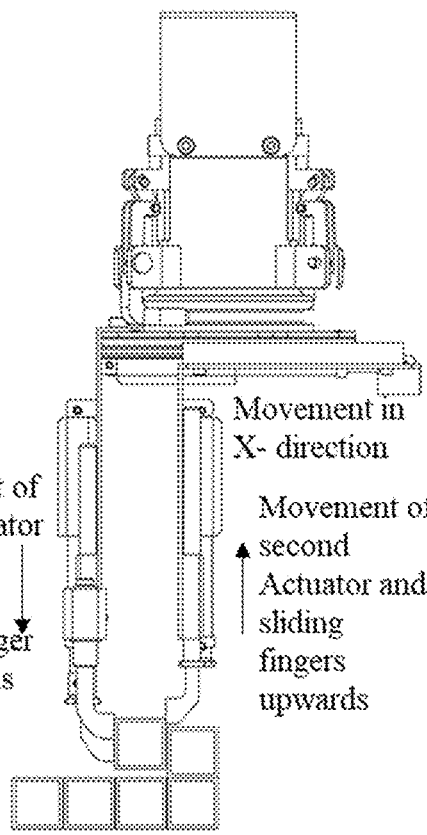
Figure 15E:
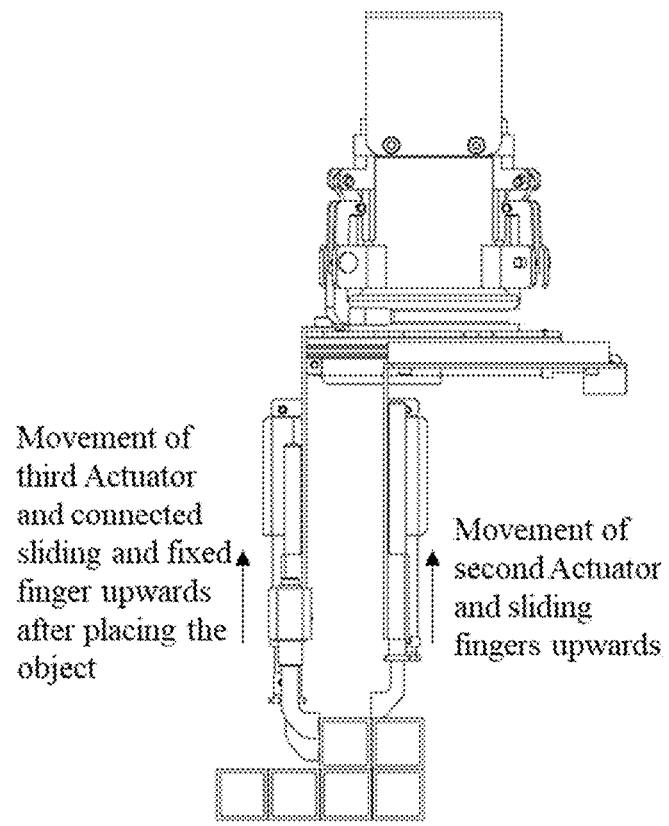
Figures 16A, 16B, 16C:
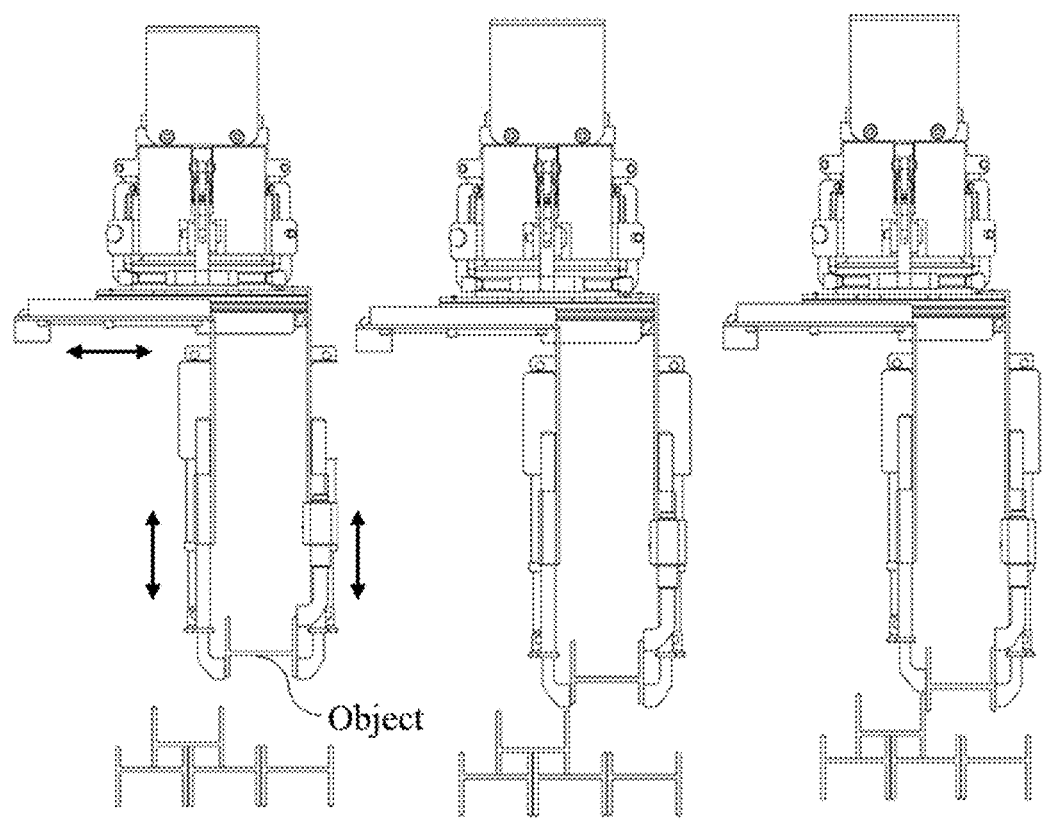
FIGS. 16A through 16G depict a working example of the gripper apparatus of FIG. 1 that grasps at least one object of a different size and shape as compared to the at least one object depicted in FIG. 5E, in accordance with an embodiment of the present disclosure.
Figures 16D, 16E:
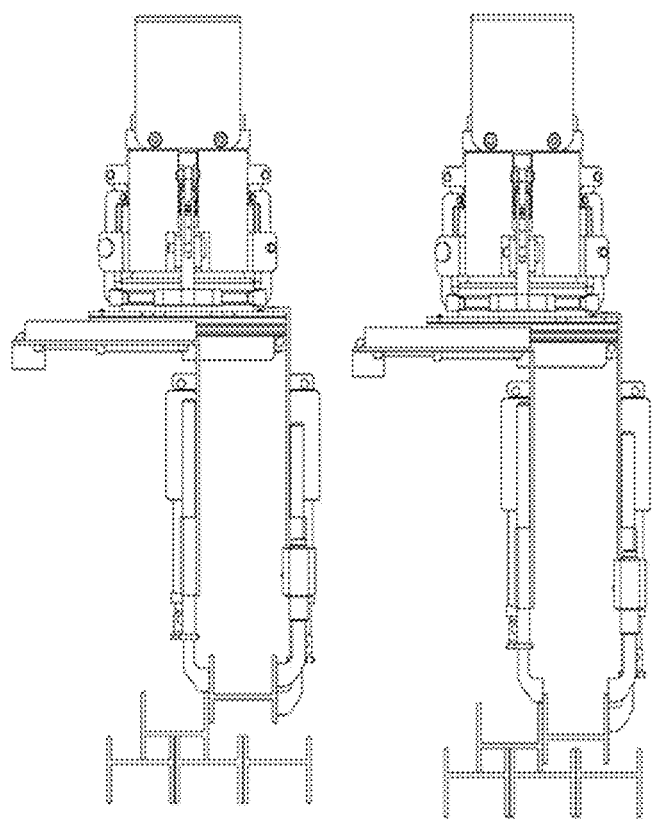
Figures 16F, 16G:
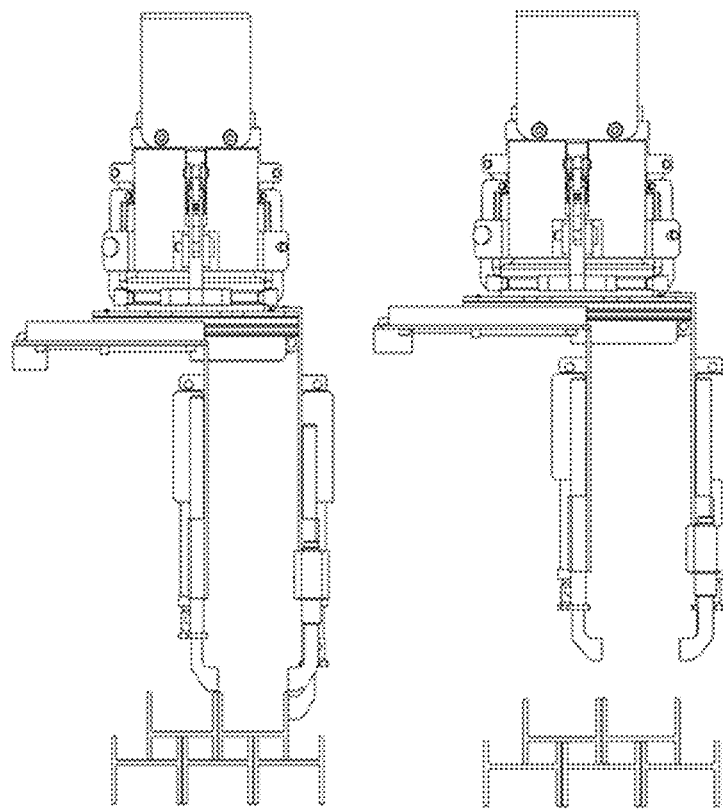

FIGS. 15A through 15E, with reference to FIG. 1 through FIG. 14, depict a working example of the gripper apparatus 100 of FIG. 1 that illustrating pick and placing of the at least one object for optimizing object manipulation space, in accordance with an embodiment of the present disclosure. It is depicted in FIGS. 15A through 15G, the gripper apparatus 100 grasps the objects of interest one by one from one location and place them to another location to form a stack/group of objects without creating gaps in between the objects. As can be seen in FIG. 15 A, an object of interest is grasped by the gripper apparatus 100. Once the object of interest is grasped, the gripper apparatus 100 places the grasped object of interest adjacent (or next to) to past object (which is earlier kept by the gripper apparatus 100) as shown in FIG. 15E. As shown in FIG. 15B, the first actuator 112 A is actuated which is configured to actuate the sliding fingers for movement of the gripper apparatus 100 in a X-direction. Further, as shown in FIG. 15C, the second actuator 112 B move upwards with the corresponding sliding fingers attached to the second actuator 112 B slightly releasing the object by placing it adjacent to another object. However, as shown in FIG. 15 D, the third actuator 112 C connected to the vertical plate 904 A along with two fixed fingers 116 A-B and a sliding finger 116 E still holds the object and supports until it is placed into the grouping. During this movement, fixed fingers of the gripper hold at constant point on the object and sliding fingers move down with the object and support the object until safe landing of the object into grouping. As shown in FIG. 15 E, the sliding fingers along with the second actuator 112 B are already de-clamped form the object and moved up. The movement of the sliding fingers along with the second actuator 112 B ensures that gaps maintained between two objects are minimal and there should not be any disturbance in the grouping/stack formed. After placement, the third actuator 112 C and the two fixed fingers and one sliding finger attached to the third actuator 112 C also move upward and task is repeated as shown in FIG. 15E. Similarly, FIGS. 16A through 16G depict a working example of the gripper apparatus 100 of FIG. 1 that grasps at least one object of a different size and shape as compared to the at least one object depicted in FIG. 5E, in accordance with an embodiment of the present disclosure.

The gripper apparatus 100 can be used for manipulation of wide range of objects and space optimization while stacking/grouping the multiple objects of varied size, length, shape, and orientation. One or more vision sensors comprising a 2D sensor, a 3D sensor or a combination of 2D and 3D sensors (3D+2D) are integrated with the gripper apparatus 100 which captures the size, shape, location, orientation and type of packaging of the objects. In the present disclosure, the one or more vision sensors are not visible and not depicted in the FIGS. In an embodiment, expression 'vision sensors' may be referred as 'cameras' or 'image capturing device' or 'video capturing device' or 'electronic device' and may be interchangeably used hereinafter. In an embodiment of the present disclosure, the vision sensor is an electronic device that captures information of at least one object to be grasped and placed. The captured information comprises size, shape, surface, and an orientation of the at least one object and the like. Further, the gripper apparatus 100 is backed by artificial intelligence-based system (e.g., one or more hardware processors 104) which decides the type of grasping to be used, dimension of the object and other critical parameters with this information. In an embodiment, the vision sensors are connected to (or are an integral part of) an external system (e.g., a robot wherein the apparatus 100 is connected to this system for passing the captured information by the robot to the apparatus for object manipulation).

The gripper apparatus 100 which could be attached to robot, can handle multi-dimensional objects and can be controlled independently. The part/object area can be scanned via the sensor array for shape and size information. Based on information, the gripper apparatus 100 utilizes an artificial intelligence-based hardware processor (e.g., wherein the artificial intelligence-based hardware processor is either an integral part of the apparatus 100 or externally connected to the apparatus 100 via input/output communication interfaces as known in the art) that decides required patterns for interlocking the objects to form a stack/group. The vision sensor/sensor array can segment the image of the at least one object for identifying an outer parameter of the object and the gripper apparatus 100 arranges positions of the plurality of fingers 116 A-E based on actuation of the plurality of actuators such that it can optimize the object manipulation space during multi object stacking/grouping ensuring minimum gap between the adjacent objects. In other words, the gripper apparatus 100 interlock the objects as per the required patterns which are already specified using the artificial intelligence-based hardware processor.

Figure 17:
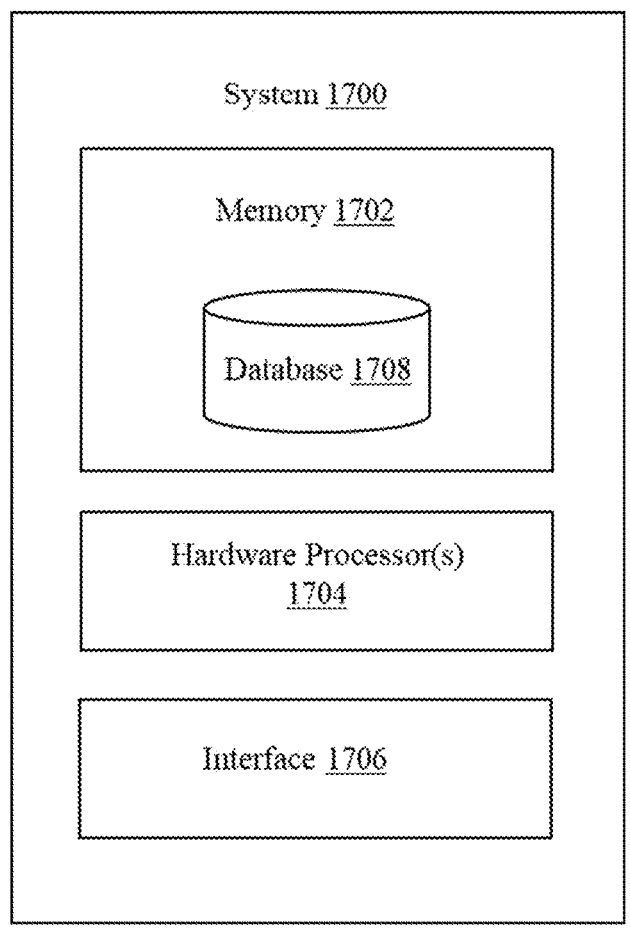
FIG. 17, with reference to FIGS. 1 through 16G, depicts a system 1700 for capturing information and estimating grasping points and amount of expansion and collapse of the plurality of fingers of the gripper apparatus 100 of FIG. 1 for grasping and placing the at least an object of interest, in accordance with an embodiment of the present disclosure.

FIG. 17, with reference to FIGS. 1 through 16G, depicts a system 1700 for capturing information and estimating grasping points and amount of expansion and collapse of the plurality of fingers 116 A-E of the gripper apparatus 100 of FIG. 1 for grasping and placing the at least an object of interest, in accordance with an embodiment of the present disclosure.

In an embodiment, the system 1700 includes one or more hardware processors 1704, communication interface device(s) or input/output (I/O) interface(s) 1706 (also referred as interface(s)), and one or more data storage devices or memory 1702 operatively coupled to the one or more hardware processors 1704. The one or more processors 1704 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 1700 can be implemented in a variety of computing systems, such as laptop computers, notebooks, hand-held devices, workstations, mainframe computers, servers, a network cloud, robot, and the like.

The I/O interface device(s) 1706 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The gripper apparatus 100 may be equipped with a 2D and/or a 3D camera (also referred as an electronic device) which provides information on complete shape of the object/profile and this input is given to the gripper apparatus 100, wherein the gripper apparatus 100 identifies the first object to be picked, depth information of the placement and a plurality of actuators which are actuated such that the plurality of fingers 116 A-E are configured for optimizing object manipulation space. Once the object/profile is grasped, it is released/placed at a surface for being stacked/grouped with other objects such that the space between the objects is minimized. The object manipulation space is optimized to have a zero gap between adjacent objects in a stack/group of objects.

The memory 1702 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 1708 is comprised in the memory 1702, wherein the database 1708 comprises information, for example, object shape, object size, object orientation, object type (e.g., deformable or non-deformable) and the like. The information stored in the database 1708 may further comprise grasping points estimated by the gripper apparatus 100 or the hardware processors 1704. The information stored in the database 1708 may further comprise position details of a first object to be grasped, information regarding when sliding finger should move upwards during placement of the object based on a constant feedback from the 2D and/or the 3D cameras which measures the position including depth of placement and gives instruction to sliding fingers to start reducing clamping force to enable them to slide down, thereby releasing the object, and amount of expansion and collapsing of the plurality of fingers 116 A-E comprised in the modular object holding unit of the gripper apparatus 100. The information stored in the database 1708 may further comprise information regarding size and dimensions of various modular holding unit which are selected depending upon the size, type, surface, orientation and shape of the object, how much amount of the plurality of fingers 116 A-E should bend during grasping of the object, at what distance a third finger form the second set of fingers should be moved up before dropping the object, and the like. The memory 1702 further comprises (or may further comprise) information pertaining to input(s)/output(s) of each step performed by the systems and methods of the present disclosure. In other words, input(s) fed at each step and output(s) generated at each step are comprised in the memory 1702 and can be utilized in further processing and analysis.

Figure 18:
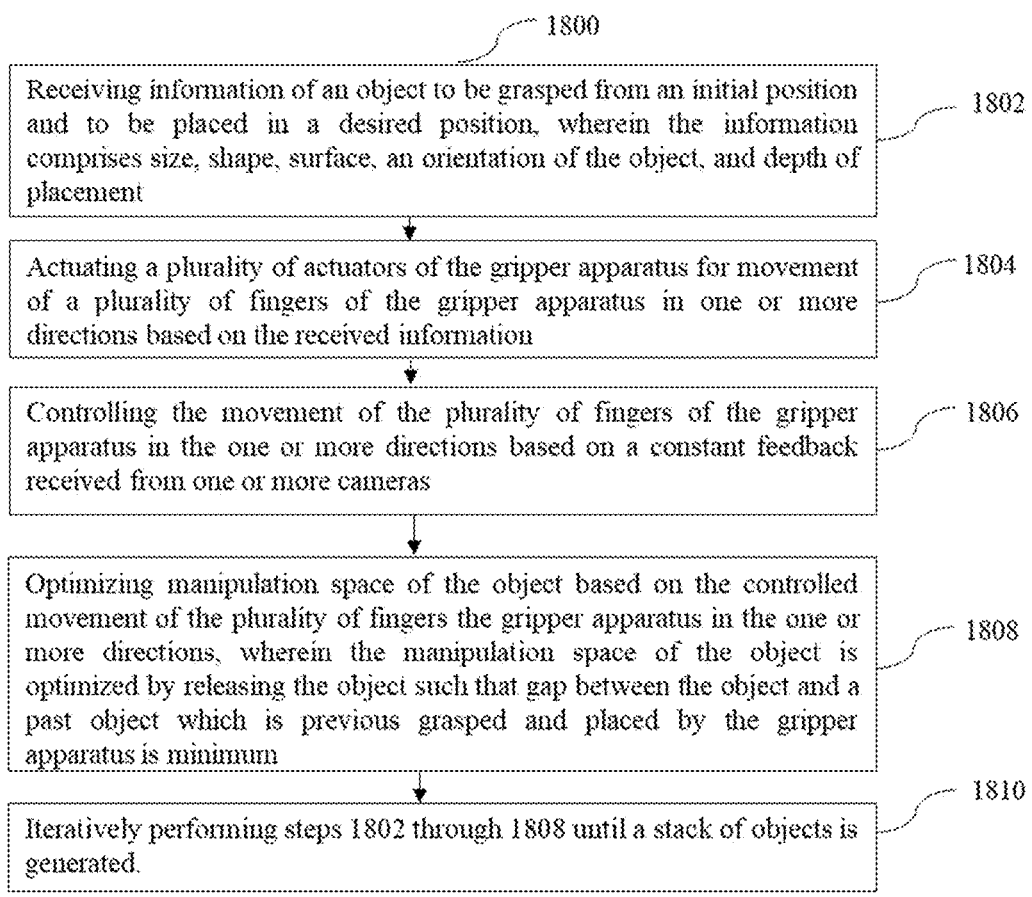
FIG. 18, with reference to FIGS. 1 through 17, depicts an exemplary flow chart illustrating a method for multi object grasping and stacking using the gripper apparatus 100 of FIG. 1, in accordance with an embodiment of the present disclosure.

FIG. 18, with reference to FIGS. 1 through 17, depicts an exemplary flow chart illustrating a method for multi object grasping and stacking using the gripper apparatus 100 of FIG. 1, in accordance with an embodiment of the present disclosure. The steps of the method of the present disclosure will now be explained with reference to components of the system 1700 of FIG. 17, FIGS. 1 through 16G, and the flow diagram as depicted in FIG. 18. In an embodiment, at step 1802 of the present disclosure, information of an object to be grasped from an initial position and to be placed in a desired position is received, wherein the information comprises size, shape, surface, an orientation of the object, and depth of placement. In an embodiment, at step 1804 of the present disclosure, a plurality of actuators 112 A-C of the gripper apparatus 100 are actuated for movement of a plurality of fingers 116 A-E of the gripper apparatus 100 in one or more directions based on the received information. In an embodiment, at step 1806 of the present disclosure, the movement of the plurality of fingers 116 A-E of the gripper apparatus 100 in the one or more directions is controlled based on a constant feedback received from one or more cameras. In an embodiment, at step 1808 of the present disclosure manipulation space of the object is optimized based on the controlled movement of the plurality of fingers 116 A-E of the gripper apparatus 100 in the one or more directions, wherein the manipulation space of the object is optimized by releasing the object such that gap between the object and a past object which is previously grasped and placed by the gripper apparatus is minimum. In an embodiment, at step 1810 of the present disclosure, steps 1802 through 1808 are iteratively performed 1808 until a stack of objects is generated.

Multi object stacking/grouping is a challenging task and used in multiple applications such as for heat treatment operation, transport packaging, and/or the like. For the heat treatment operation, the multi object stacking/grouping gives advantages of retaining shape of the objects, reducing thermal deformations and maximizing space utilization in thermal chambers. Similarly, for transport packaging where the whole stacked/grouped bundles of multiple objects can be transferred instead transporting them individually. During object pattern stacking/grouping, it is also necessary to group them with minimal gap in between the objects. Traditionally manual intervention (e.g. human being) is involved to pick up and place the objects/items for ensuring pattern-based object stacking. This leads to higher cost infrastructure and low productivity. Few conventional grippers are utilized for object manipulation space optimization. However, conventional gripper devices fail to optimize object manipulation space and are unable to handle objects of different cross sections with larger lengths. Embodiments of the present disclosure provide the gripper apparatus 100 that addresses and overcomes the limitation of the conventional gripper devices by using different modular object holding units which are changed in accordance with the size, shape and length of the object to be grasped by the gripper apparatus 100. To support it, the gripper apparatus 100 provides a provision for clamping and declamping the modular object holding unit 104 from the adaptor holding unit 102 of the gripper apparatus 100 based on a special mechanism.

The gripper apparatus 100 is connected to a robot or an external system via one or more coupling systems (e.g., connectors as known in the art) or input/output interfaces as known in the art. The external system or the robot comprises (or may comprise) the components as shown in FIG. 17, wherein the robot or external system receives information being captured by the electronic device. In an embodiment, the electronic device may be comprised in the external system or the robot. In another embodiment, the system 1700 may be comprised in the gripper apparatus 100. The same information is processed by the one or more hardware processors 1704 which estimate movement of a plurality of fingers 116 A-E to provide a 3 degree of freedom of motion when actuated by the actuators. The same information is processed by the one or more hardware processors that estimate one or more grasping points, and an amount of collapsing and expansion of the plurality of fingers 116 A-E, based on the captured information. The robot or external system may be connected to the gripper apparatus 100 (e.g., the robot or external system may be connected to the adaptor holding unit 102) and wherein the robot or external system may be operated in such a way that the gripper apparatus 100 is monitored/controlled to grasp object of interest firmly and place for object stacking/grouping in real-time until almost zero gap between adjacent objects is achieved by the gripper apparatus 100. In an embodiment, the system 100 may be comprised within (or integrated inside) the gripper apparatus 100. In another embodiment, the system 100 may be externally connected to the gripper apparatus 100 via one or more interfaces/coupling mechanism/connectivity means, etc.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A gripper apparatus for grasping and stacking objects, comprising:
   an adaptor holding unit comprising a top mounting plate and a bottom mounting plate, wherein the adaptor holding unit comprises:
      a lead screw housing comprising a top end and a bottom end, wherein the top end of the lead screw housing is coupled to a bottom surface of the bottom mounting plate of the adaptor holding unit via a coupling mechanism, wherein the lead screw housing comprises:
         a plurality of slots, wherein each of the plurality of slots is equiangularly positioned from one another;
         a plurality of pair flanges, wherein each flange from the plurality of pair flanges comprises a corresponding hole; and
         a plurality of tapered slots, wherein each of the plurality of tapered slots is positioned at at least one corresponding slot from the plurality of slots, wherein each of the plurality of tapered slots is positioned in an inner area of the bottom surface of the lead screw housing and is protruding towards substantially center area of each corresponding pair of flanges;
      a plurality of threaded nut segments, wherein each of the plurality of threaded nut segments is adapted to slide in a corresponding slot of the plurality of slots, each of the plurality of threaded nut segments comprises a first end and a second end, wherein each of the first end and the second end comprises a hole;
      a plurality of jaws, each of the plurality of jaws comprises a first jaw sleeve and a second jaw sleeve that are positioned at a location from a first end and a second end of each of the plurality of jaws,
      wherein each of the first jaw sleeve and the second jaw sleeve comprises a first end and a second end respectively,
      wherein the first end of the first jaw sleeve and the first end of the second jaw sleeve are coupled to a substantially center area of each jaw from the plurality of jaws,
      wherein each of the first jaw sleeve and the second jaw sleeve comprises a first hole and a second hole,
      wherein the first end of the first jaw sleeve and the first end of the second jaw sleeve of the plurality of jaws are hinged with a corresponding pair flanges of the plurality of pair flanges using a hinging component that passes from a first flange of the corresponding pair flanges through the first jaw sleeve and the second jaw sleeve of each corresponding jaw of the plurality of jaws and connects to a second flange of the corresponding pair flanges via the first hole of the first jaw sleeve and the first hole of the second jaw sleeve,
      wherein each of the plurality of tapered slots is adapted to refrain each corresponding jaw of the plurality of jaws from colliding with the lead screw housing during at least one of a first action and a second action;
   a plurality of links, wherein each of the plurality of links comprises a hole at a first end and a hole at second end, wherein each of the plurality of links is adapted to link the second end of the first jaw sleeve and the second end of the second jaw sleeve to each of the first end and the second end of a corresponding threaded nut segment from the plurality of threaded nut segments via the hole at the first end and the hole at the second end of a corresponding threaded nut segments using a linking component; and
   a modular object holding unit having a first end and a second end, wherein the first end of the modular object holding unit comprises an adaptor that is adapted to be fitted at a tapered bottom surface of the bottom end of the lead screw housing, wherein the modular object holding unit comprises:

a plurality of plates comprising a first end and a second end, wherein a first plate of the plurality of plates comprises a top surface and a bottom surface, wherein the top surface of the first plate is coupled to a bottom surface of the adaptor;

a plurality of linear motion (LM) guides positioned between the first plate and a second plate of the plurality of plates, wherein the first end of a third plate is coupled to the top surface of the first plate;

a finger holder coupled to the second end of the third plate, wherein the finger holder comprises a first side and a second side that is opposite to the first side, wherein each of the first side and the second side comprises a hole; and a plurality of fingers, wherein the plurality of fingers comprises a first set of fingers and a second set of fingers that are different from the first set of fingers, wherein a first finger and a second finger from the first set of fingers are adapted to be fitted through the hole of the first side and the second side of the finger holder respectively, wherein a first finger and a second finger from the second set of fingers are coupled to a corresponding guiding rod attached to the second plate, wherein a third finger from the second set of fingers is coupled to a corresponding guiding rod coupled to the third plate, and wherein the plurality of fingers are actuated for grasping and stacking one or more objects such that first set of fingers and the second set of fingers are configured for optimizing object manipulation space.

2. The gripper apparatus of claim 1, further comprising a plurality of locking ends, wherein each locking end of the plurality of locking ends form a part of the lead screw housing and extends from the top end through the bottom end of the lead screw housing, wherein each of the plurality of locking ends is adapted to (i) retain a corresponding threaded nut segment in engagement from the plurality of threaded nut segments and (ii) refrain the corresponding threaded nut segment from coming outside the lead screw housing during movement of the corresponding threaded nut segment that is driven by a to and fro motion using a lead screw being operated inside the lead screw housing.

3. The gripper apparatus of claim 1, further comprising a plurality of actuators, wherein a first actuator from the plurality of actuators is positioned between the first plate and the second plate such that the first actuator is between the plurality of LM guides, and wherein the first actuator is connected to the first plate and configured to actuate the second set of fingers for movement of the gripper apparatus in a first direction.

4. The gripper apparatus of claim 3, wherein a second actuator from the plurality of actuators is connected to the second plate and a third actuator from the plurality of actuators is connected to the third plate, wherein the second actuator and the third actuator are configured to actuate the second set of fingers for movement of the gripper apparatus in a second direction.

5. The gripper apparatus of claim 4, wherein the first actuator is configured to allow movement and sliding of (i) the second set of fingers (ii) the second actuator and (iii) a bush connected to a corresponding guiding rod in the first direction and provide 'x' degree of freedom in the first direction.

6. The gripper apparatus of claim 4, wherein the corresponding guiding rod coupled to the second plate slide along one or more bushes from the plurality of bushes attached thereof for movement, wherein the movement is achieved or actuated using the second actuator to provide a degree of freedom in a second direction.

7. The gripper apparatus of claim 4, wherein a third actuator from the plurality of actuators is connected to the third plate, wherein a guiding rod is connected to the third finger from the second set of fingers in a plane of the first set of fingers, wherein the guiding rod is configured to (i) slide inside a corresponding bush mounted on the third plate and (ii) provide a degree of freedom in the second direction.

8. The gripper apparatus of claim 1, wherein the first set of fingers is a set of fixed fingers.

9. The gripper apparatus of claim 1, wherein the second set of fingers is a set of sliding fingers.

10. The gripper apparatus of claim 1, wherein the plurality of jaws are configured to self-center and lock the adaptor into the tapered bottom surface of the lead screw housing.

11. The gripper apparatus of claim 2, wherein when the lead screw is operated using a motor, the lead screw is configured to move the plurality of threaded nut segments in at least one of (i) an upward direction and (ii) a downward direction.

12. The gripper apparatus of in claim 11, wherein based on the movement of the plurality of threaded nut segments, the first end and the second end of each link from the plurality of links rotate from an initial position to a desired position.

13. The gripper apparatus of claim 12, wherein based on the rotation of the first end and the second end of a corresponding link from the plurality of links, each of the plurality of jaws move in a specific direction and lock the adaptor into the tapered bottom surface of the lead screw housing.

* * * * *